United States Patent
Benoit et al.

(10) Patent No.: US 9,955,333 B2
(45) Date of Patent: Apr. 24, 2018

(54) SECURE WIRELESS WAKE-UP COMPANION

(71) Applicant: QUALCOMM Incorporated, San Diego, CA (US)

(72) Inventors: Olivier Jean Benoit, San Diego, CA (US); Stephen Jay Shellhammer, Ramona, CA (US); Rahul Malik, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 44 days.

(21) Appl. No.: 14/673,628

(22) Filed: Mar. 30, 2015

(65) Prior Publication Data

US 2016/0057703 A1 Feb. 25, 2016

(51) Int. Cl.
*H04W 8/00* (2009.01)
*H04W 52/02* (2009.01)
(Continued)

(52) U.S. Cl.
CPC .......... *H04W 8/005* (2013.01); *H04W 12/04* (2013.01); *H04W 12/06* (2013.01); *H04W 12/10* (2013.01); *H04W 52/0216* (2013.01); *H04W 52/0219* (2013.01); *H04W 52/0225* (2013.01); *H04W 52/0229* (2013.01); *H04W 68/005* (2013.01); *H04W 68/02* (2013.01);
(Continued)

(58) Field of Classification Search
None
See application file for complete search history.

(56) References Cited

U.S. PATENT DOCUMENTS 8,953,547 B2 * 2/2015 Huang .............. H04W 52/0225
370/280
9,137,823 B1 * 9/2015 Liu ...................... H04W 74/006
(Continued)

OTHER PUBLICATIONS

International Search Report and Written Opinion—PCT/US2016/021924—ISA/EPO—dated Jun. 7, 2016.
(Continued)

*Primary Examiner* — Donald Mills
(74) *Attorney, Agent, or Firm* — Patterson & Sheridan, LLP

(57) ABSTRACT

Certain aspects of the present disclosure generally relate to wireless communications and, more particularly, to ultra low power paging frames for wake up and discovery. One example apparatus for wireless communications generally includes at least one interface configured to obtain a frame via a first radio and a second radio, wherein the interface receives a frame from another apparatus via the second radio while the first radio is in a first power state; and a processing system configured to take one or more actions based on a command field included in the frame. A second example apparatus for wireless communications generally includes at least one interface configured to obtain a frame via a first radio and a second radio, wherein the interface receives a frame from another apparatus via the second radio while the first radio is in a first power state; and a processing system configured to take one or more actions based on whether or not an authentication code included in the frame matches a local authentication code.

18 Claims, 17 Drawing Sheets

(51) Int. Cl.

| | |
|---|---|
| *H04W 68/00* | (2009.01) |
| *H04W 12/04* | (2009.01) |
| *H04W 12/06* | (2009.01) |
| *H04W 68/02* | (2009.01) |
| *H04W 12/10* | (2009.01) |
| H04W 84/12 | (2009.01) |
| H04W 76/02 | (2009.01) |
| H04L 29/06 | (2006.01) |
| H04W 88/06 | (2009.01) |

(52) U.S. Cl.
CPC ....... *H04L 63/123* (2013.01); *H04W 52/0209* (2013.01); *H04W 76/023* (2013.01); *H04W 84/12* (2013.01); *H04W 88/06* (2013.01); *Y02B 60/50* (2013.01)

(56) References Cited

U.S. PATENT DOCUMENTS

| | | | | |
|---|---|---|---|---|
| 2002/0133534 | A1* | 9/2002 | Forslow | H04L 12/4641 709/200 |
| 2004/0077383 | A1 | 4/2004 | Lappetelainen et al. | |
| 2009/0144550 | A1* | 6/2009 | Arunan | H04L 63/068 713/171 |
| 2009/0219846 | A1 | 9/2009 | Chan et al. | |
| 2009/0286564 | A1 | 11/2009 | Ho | |
| 2010/0135263 | A1* | 6/2010 | Zakrzewski | G01D 21/00 370/338 |
| 2010/0195552 | A1 | 8/2010 | Ho | |
| 2010/0268949 | A1* | 10/2010 | Schuetze | H04L 9/002 713/168 |
| 2011/0107075 | A1 | 5/2011 | Kwak | |
| 2012/0119902 | A1* | 5/2012 | Patro | H04L 12/12 340/502 |
| 2012/0174216 | A1* | 7/2012 | Vukovic | H04L 63/1466 726/22 |
| 2013/0155905 | A1 | 6/2013 | Sampath et al. | |
| 2013/0329658 | A1* | 12/2013 | Liu | H04W 74/02 370/329 |
| 2014/0050320 | A1* | 2/2014 | Choyi | H04L 63/08 380/270 |
| 2014/0112229 | A1 | 4/2014 | Merlin et al. | |
| 2014/0192985 | A1* | 7/2014 | Wentink | H04W 12/04 380/273 |
| 2015/0040195 | A1* | 2/2015 | Park | H04W 12/06 726/4 |
| 2015/0237069 | A1* | 8/2015 | Rochon | H04L 47/34 726/4 |
| 2015/0244619 | A1 | 8/2015 | Zheng et al. | |
| 2015/0304950 | A1 | 10/2015 | Li et al. | |
| 2016/0057605 | A1* | 2/2016 | Shellhammer | H04W 8/005 370/311 |
| 2016/0212781 | A1 | 7/2016 | Gao et al. | |
| 2017/0311149 | A1 | 10/2017 | Shellhammer et al. | |

OTHER PUBLICATIONS

ETRI: "Discussion on Discovery for D2D Proximity Services," 3GPP Draft; R2-132589 Discussion on Discovery for D2D Proximity Services, 3rd Generation Partnership Project (3GPP), Mobile Competence Centre ; 650, Route Des Lucioles ; F-06921 Sophia-Antipolis Cedex vol. RAN WG2, no. Barcelona, Spain; Aug. 19, 2013-Aug. 23, 2013, Aug. 9, 2013 (Aug. 9, 2013), XP050718249, Retrieved from the Internet: URL:http://www.3gpp.org/ftp/tsg_ran/WG2_RL2/TSGR2_83/Docs/ [retrieved on Aug. 9, 2013].

Texas Instruments: "Scenarios and Requirements for Device to Device Proximity Services", 3GPP Draft; R1-130103, 3rd Generation Partnership Project (3GPP), Mobile Competence Centre ; 650, Route Des Lucioles ; F-06921 Sophia-Antipolis Cedex ; France vol. RAN WG1, no. St Julian; Jan. 2, 2013 Feb. 1, 2013 Jan. 19, 2013 (Jan. 19, 2013), XP050663549, Retrieved from the Internet: URL:http://www.3gpp.org/ftp/tsg_ran/WG1_RL1/TSGR1_72/Docs/ [retrieved on Jan. 19, 2013].

* cited by examiner

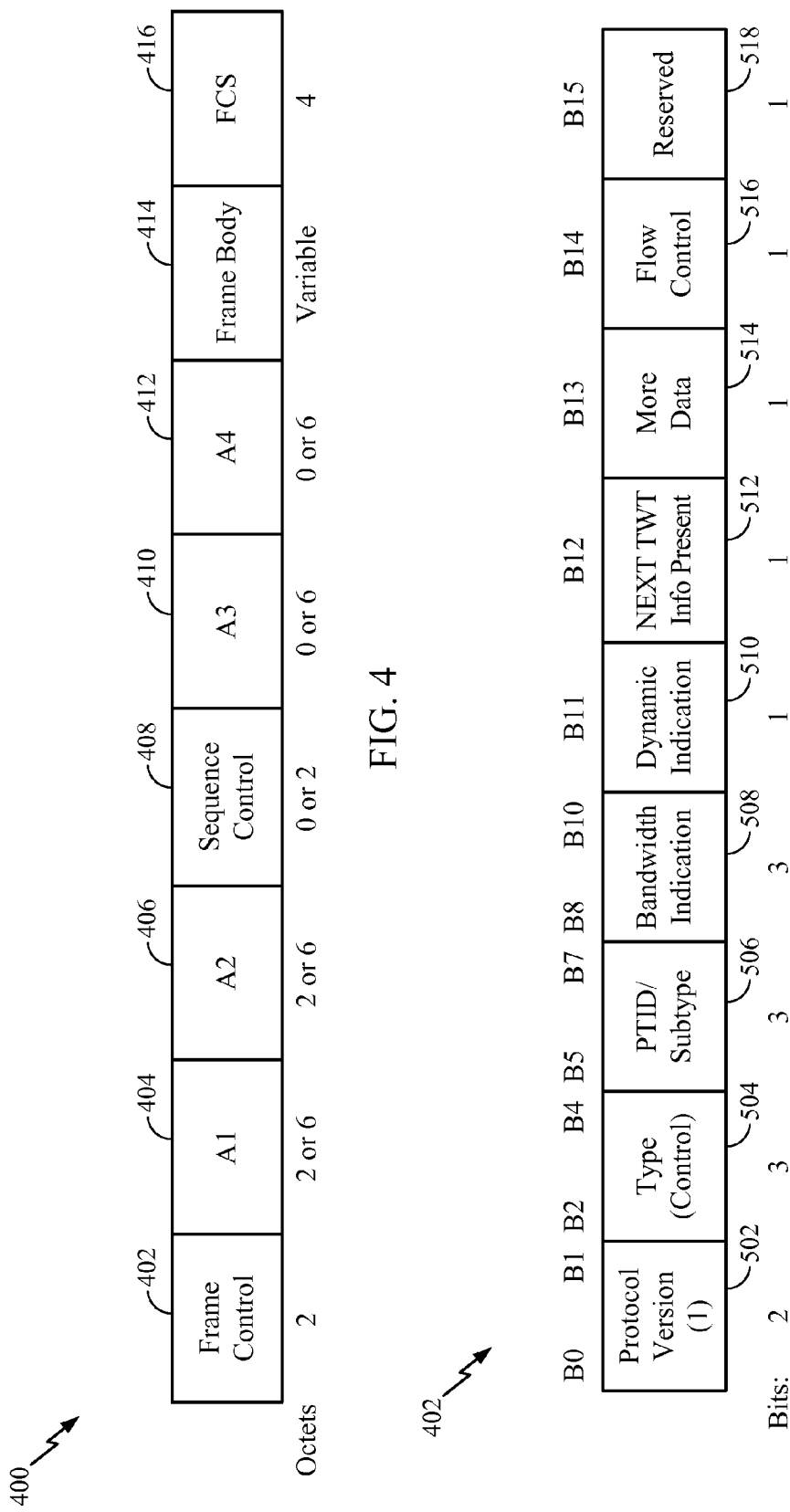

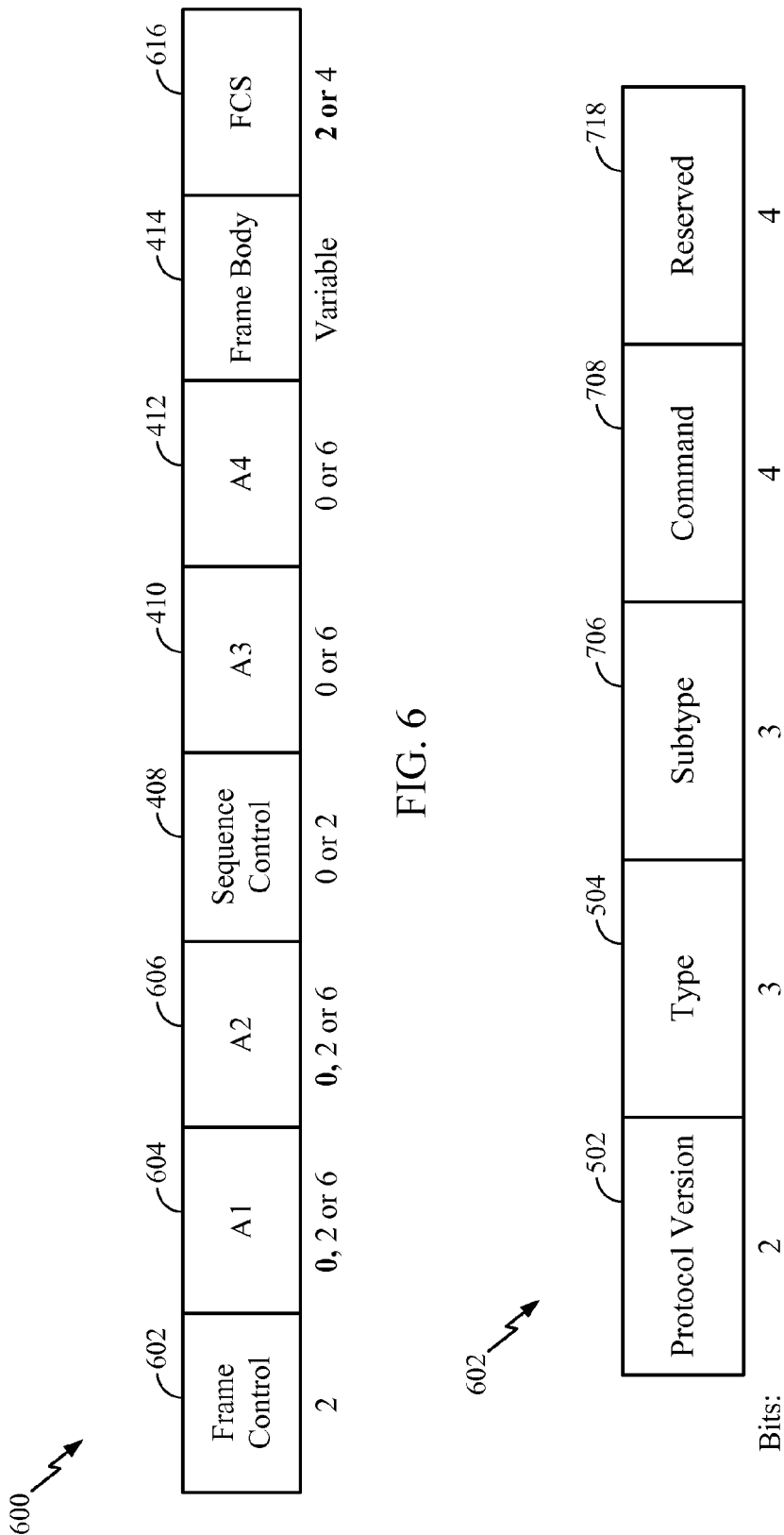

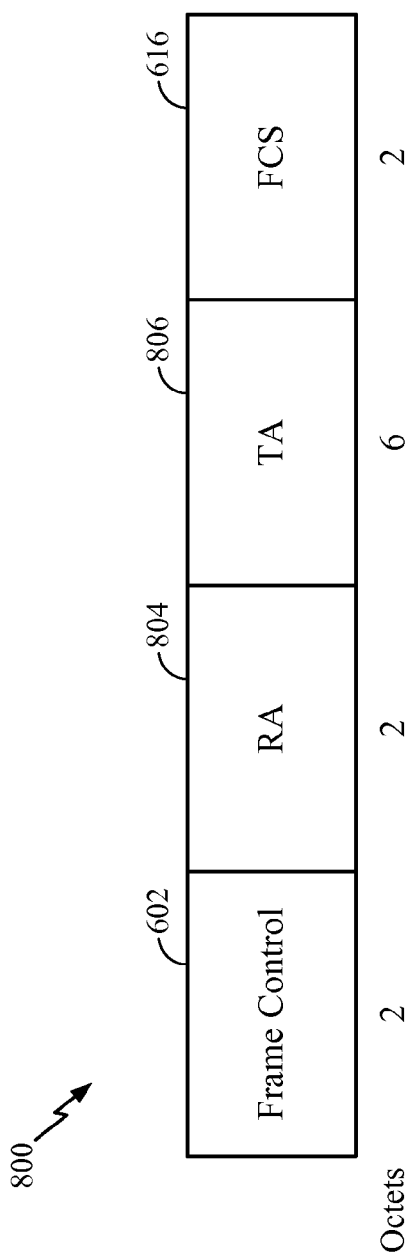
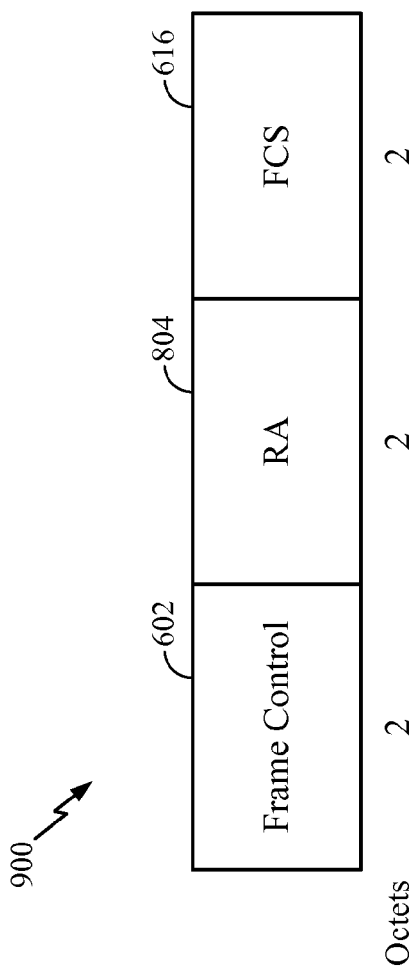

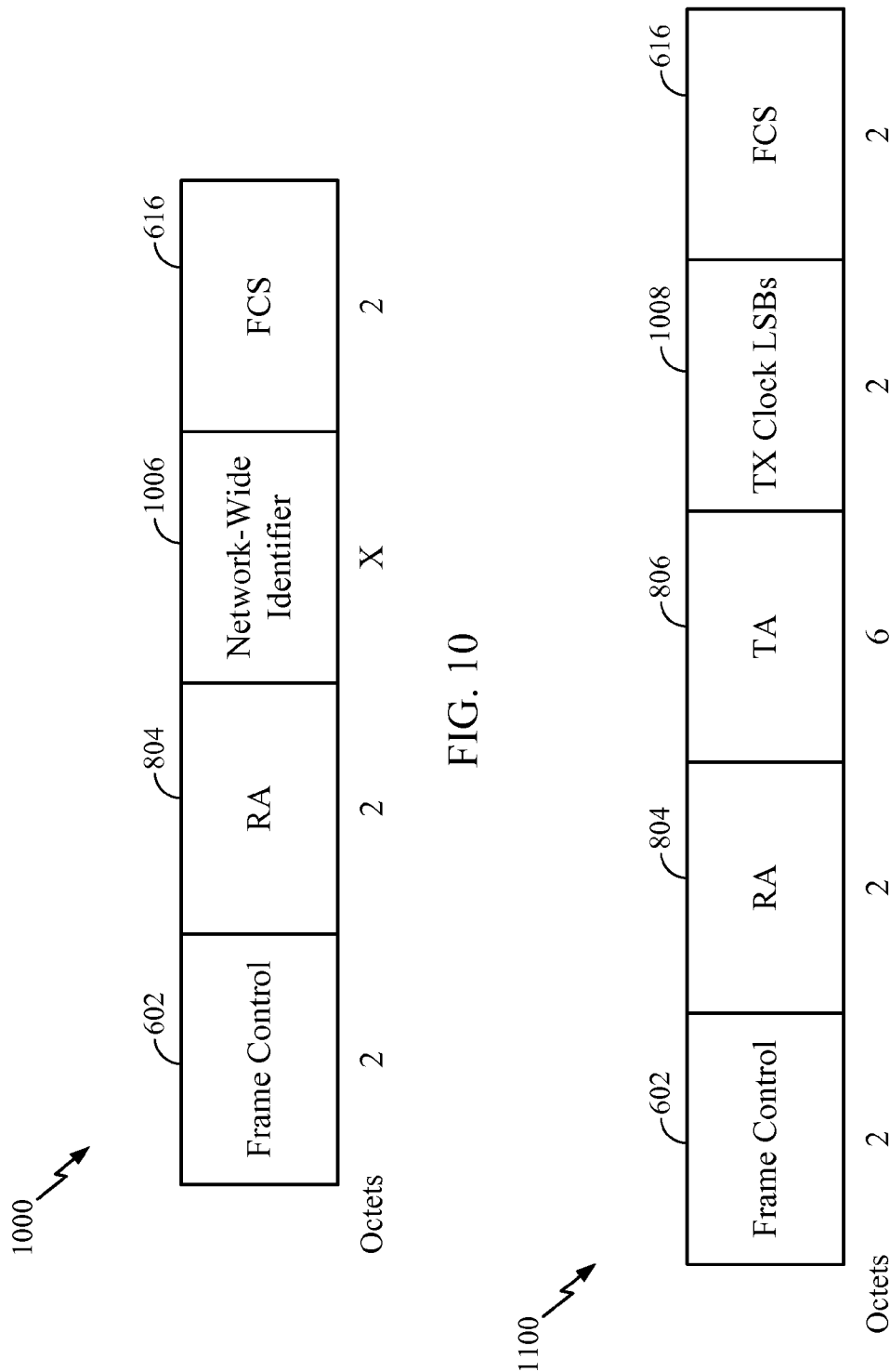

SECURE WIRELESS WAKE-UP COMPANION

BACKGROUND

I. Field of the Disclosure

Certain aspects of the present disclosure generally relate to wireless communications and, more specifically, to ultra-low power paging frames (e.g., short medium access control (MAC) frames) for wake-up and discovery.

II. Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide for ultra-low power paging frames (e.g., short medium access control (MAC) frames) for wake-up and discovery.

Certain aspects of the present disclosure provide an apparatus for wireless communications. The apparatus generally includes at least one interface configured to receive via a first radio and a second radio, wherein the at least one interface receives a paging frame from another apparatus via the second radio while the first radio is in a low power state; and a processing system configured to take one or more actions based on a command field included in the paging frame.

Certain aspects of the present disclosure provide an apparatus for wireless communications. The apparatus generally includes a processing system configured to determine whether another apparatus is capable of receiving a paging frame, via a second radio, while a first radio is in a low-power state and based on the determination, generate a paging frame comprising a command field that indicates one or more actions for the other apparatus to take; and at least one interface configured to output the paging frame for transmission to the other apparatus.

Certain aspects of the present disclosure provide a method for wireless communications by a user equipment (UE). The method generally includes receiving a paging frame from an apparatus via a second radio while a first radio is in a low power state and taking one or more actions based on a command field included in the paging frame.

Certain aspects of the present disclosure provide a method for wireless communications by an apparatus. The method generally includes determining whether another apparatus is capable of receiving a paging frame, via a second radio, while a first radio is in a low-power state, based on the determination, generating a paging frame comprising a command field that indicates one or more actions for the other apparatus to take, and transmitting the paging frame to the other apparatus.

Certain aspects of the present disclosure provide an apparatus for wireless communications. The apparatus generally includes means for receiving a paging frame from another apparatus via a second radio while a first radio is in a low power state and means for taking one or more actions based on a command field included in the paging frame.

Certain aspects of the present disclosure provide an apparatus for wireless communications. The apparatus generally includes means for determining whether another apparatus is capable of receiving a paging frame, via a second radio, while a first radio is in a low-power state, means for generating, based on the determination, a paging frame comprising a command field that indicates one or more actions for the other apparatus to take, and means for transmitting the paging frame to the other apparatus.

Certain aspects of the present disclosure provide a computer program product. The computer program product generally includes a computer readable medium having instructions stored thereon for: receiving a paging frame from an apparatus via a second radio while a first radio is in a low power state, and taking one or more actions based on a command field included in the paging frame.

Certain aspects of the present disclosure provide a computer program product. The computer program product generally includes a computer readable medium having instructions stored thereon for: determining whether an apparatus is capable of receiving a paging frame, via a second radio, while a first radio is in a low-power state; based on the determination, generating a paging frame comprising a command field that indicates one or more actions for the apparatus to take, and transmitting the paging frame to the apparatus.

Certain aspects of the present disclosure provide a station. The station generally includes a first radio, a second radio configured to receive a paging frame from an apparatus while the first radio is in a low power state, and a processing system configured to take one or more actions based on a command field included in the paging frame.

Certain aspects of the present disclosure provide an apparatus for wireless communications. The apparatus generally includes at least one antenna and a processing system configured to: determine whether an apparatus is capable of receiving a paging frame, via a second radio, while a first radio is in a low-power state; based on the determination, generate a paging frame comprising a command field that indicates one or more actions for the apparatus to take; and output the paging frame for transmission, via the at least one antenna, to the apparatus.

Certain aspects of the present disclosure provide for using frame authentication codes (FACs) with ultra-low power paging frames to authenticate the ultra-low power paging frames.

Certain aspects of the present disclosure provide an apparatus for wireless communications. The apparatus generally includes at least one interface configured to obtain a frame via at least one of a first radio or a second radio, wherein the at least one interface obtains the frame from another apparatus via the second radio while the first radio is in a first power state; and a processing system configured to take one or more actions based on whether or not an authentication code included in the frame matches a local authentication code.

Certain aspects of the present disclosure provide an apparatus for wireless communications. The apparatus generally includes a processing system configured to determine based on capabilities information of another apparatus obtained via a communication with the other apparatus, whether the other apparatus is capable of receiving a frame, via a second radio, while a first radio is in a first power state and based on the determination, generate a frame comprising an authentication code to be used for authenticating the frame; and at least one interface configured to output the frame for transmission to the other apparatus.

Certain aspects of the present disclosure provide a method for wireless communications by a user equipment (UE). The method generally includes receiving a frame from an apparatus via a second radio while a first radio is in a first power state and taking one or more actions based on whether or not an authentication code included in the frame matches a local authentication code.

Certain aspects of the present disclosure provide a method for wireless communications by an apparatus. The method generally includes determining, based on capabilities information of another apparatus obtained via a communication with the other apparatus, whether the other apparatus is capable of receiving a frame, via a second radio, while a first radio is in a first power state, based on the determination, generating a frame comprising an authentication code to be used for authenticating the frame, and transmitting the frame to the other apparatus.

Certain aspects of the present disclosure provide an apparatus for wireless communications. The apparatus generally includes means for receiving a frame from another apparatus via a second radio while a first radio is in a first power state and means for taking one or more actions based on whether or not an authentication code included in the frame matches a local authentication code.

Certain aspects of the present disclosure provide an apparatus for wireless communications. The apparatus generally includes means for receiving a communication from another apparatus, means for obtaining capabilities information of the other apparatus from the communication, means for determining, based on the capabilities information, whether the other apparatus is capable of receiving a frame, via a second radio, while a first radio is in a first power state, means for generating, based on the determination, a frame comprising an authentication code to be used for authenticating the frame, and means for transmitting the frame to the other apparatus.

Certain aspects of the present disclosure provide a computer program product. The computer program product generally includes a computer readable medium having instructions stored thereon for: receiving a frame from an apparatus via a second radio while a first radio is in a first power state, and taking one or more actions based on whether or not an authentication code included in the frame matches a local authentication code.

Certain aspects of the present disclosure provide a computer program product. The computer program product generally includes a computer readable medium having instructions stored thereon for: determining based on capabilities information of an apparatus obtained via a communication with the apparatus whether the apparatus is capable of receiving a frame, via a second radio, while a first radio is in a first power state; based on the determination, generating a frame comprising an authentication code to be used for authenticating the frame, and transmitting the frame to the apparatus.

Certain aspects of the present disclosure provide a station. The station generally includes a first radio, a second radio configured to receive a frame from an apparatus while the first radio is in a first power state, and a processing system configured to take one or more actions based on whether or not an authentication code included in the frame matches a local authentication code.

Certain aspects of the present disclosure provide an apparatus for wireless communications. The apparatus generally includes a processing system configured to: determine, based on a communication with an apparatus, whether the apparatus is capable of receiving a frame, via a second radio, while a first radio is in a first power state; based on the determination, generate a paging frame comprising an authentication code to be used for authenticating the frame; and output the frame for transmission, via the at least one antenna, to the apparatus.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates an example short frame format, according to certain aspects of the present disclosure.

FIG. 5 illustrates exemplary subfields of a frame control (FC) field, in accordance with certain aspects of the present disclosure.

FIG. 6 illustrates an example short control frame format for ultra-low power paging frames, in accordance with certain aspects of the present disclosure.

FIG. 7 illustrates a subfield of the FC field of the example short control frame format for ultra-low power paging frames, in accordance with certain aspects of the present disclosure.

FIGS. 8-10 illustrate example ultra-low power paging frames for primary radio wake-up, in accordance with certain aspects of the present disclosure.

FIGS. 11 and 12 illustrate example ultra-low power paging frames for clock resynchronization, in accordance with certain aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
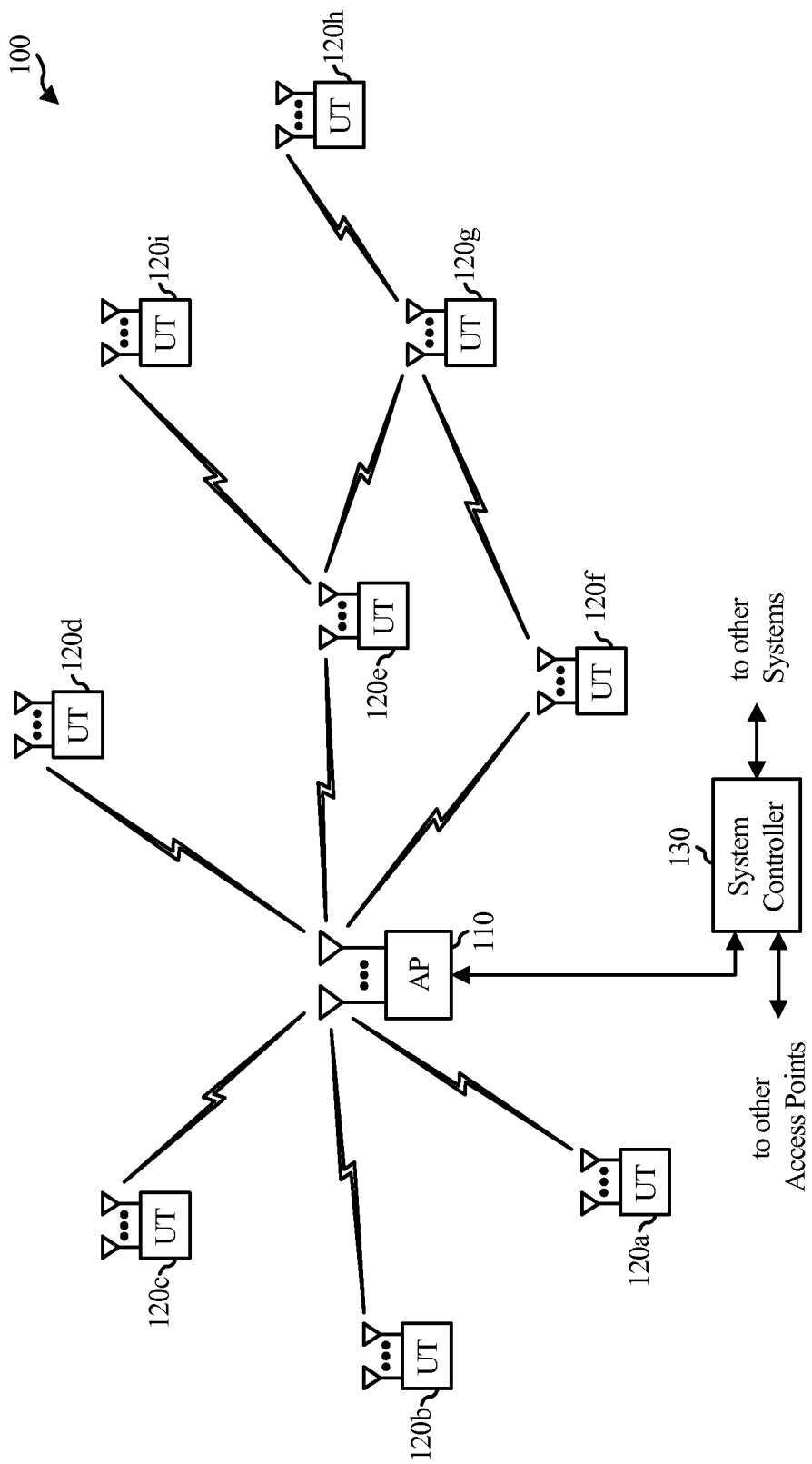
FIG. 1 illustrates a diagram of an example wireless communications network, in accordance with certain aspects of the present disclosure.

Techniques and apparatus are provided herein for ultra-low power frames (e.g., short medium access control (MAC) frames). The ultra-low power frames may be useful for paging, wake-up, discovery, and clock resynchronization of wireless communications devices. The provided techniques and apparatus may allow securing the ultra-low power frames and apparatus to prevent malicious devices from using the provided techniques both to activate (e.g., wake up) radios of devices excessively (e.g., to drain battery power of a sleeping device) and to interfere with clock resynchronization of devices.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

An Example Wireless Communication System

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminals 120.

Figure 2:
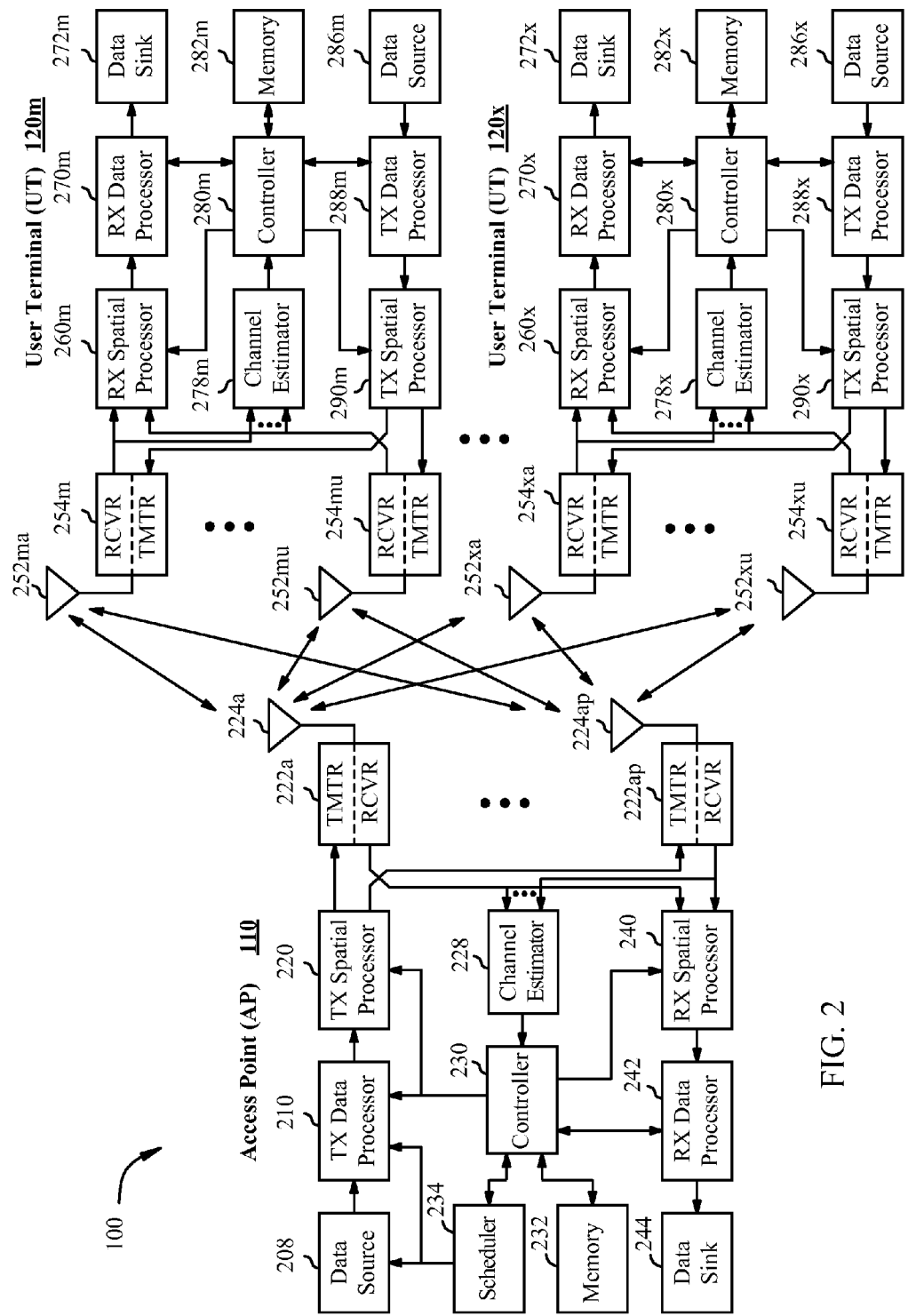
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
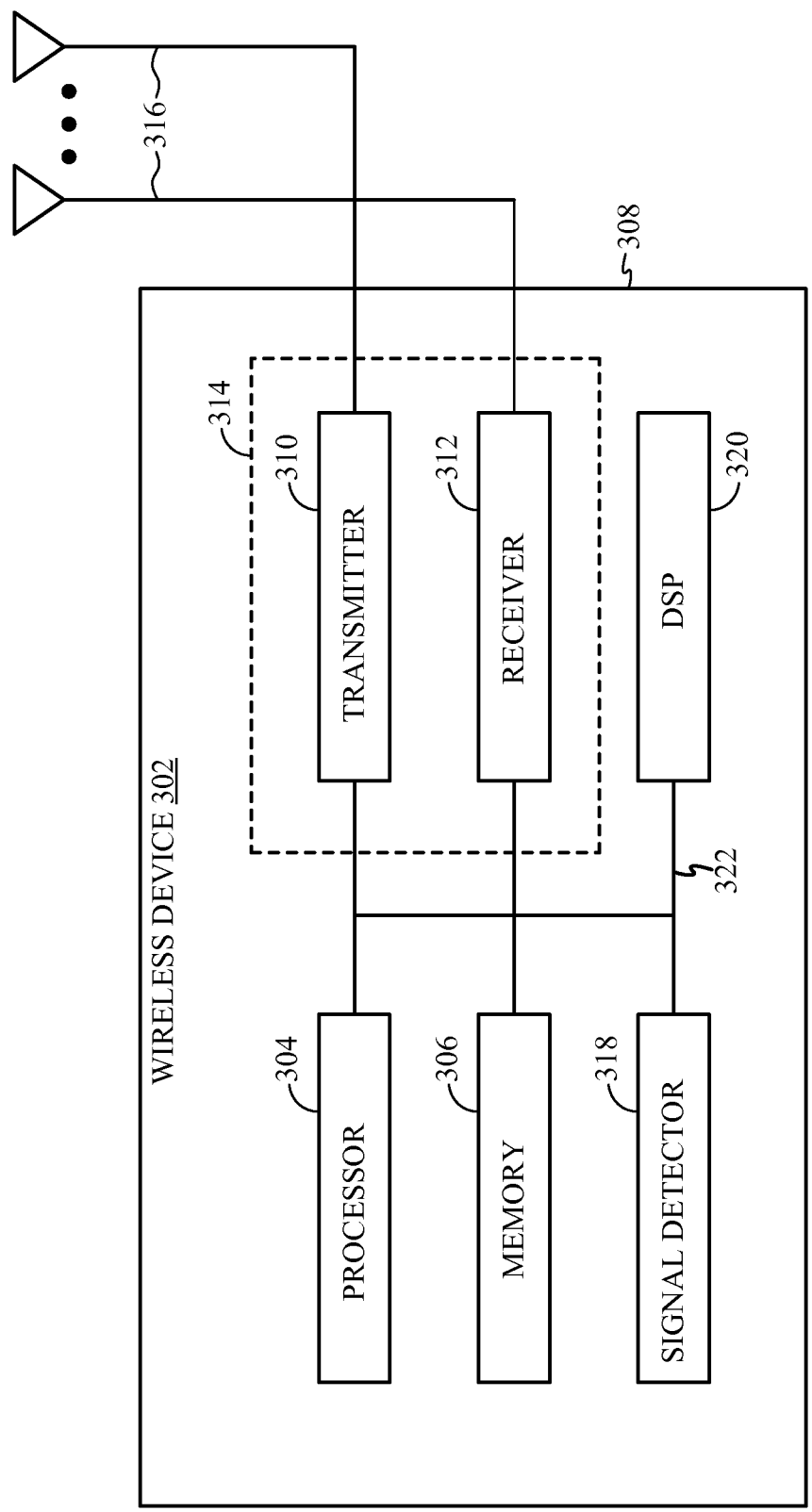
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein, e.g., operations 1600, 1700, 1800, and 2100 illustrated in FIGS. 16-18 and 21. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein, e.g., operations 1600, 1700, 1800, and 2100 illustrated in FIGS. 16-18 and 21.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Short Control Frames

In certain systems (e.g., IEEE 802.11ah systems), a short frame may be a medium access control (MAC) protocol data unit (MPDU) having a protocol version field in a frame control field (FCF) set to 1.

FIG. 4 illustrates an example short frame format 400, according to certain aspects of the present disclosure. As shown in FIG. 4, the short frame format 400 may include a 2-byte Frame Control (FC) field 402, a 2-byte or 6-byte first Address field (A1) 404, a 2-byte or 6-byte second Address field (A2) 406, a 0-byte (e.g., not included) or 2-byte Sequence Control (SC) field 408, a 0-byte or 6-byte third Address (A3) field 410, a 0-byte or 6-byte fourth Address field (A4) 412, a variable length Frame Body field 414, and a 4-byte Frame Check Sequence (FCS) field 416. As shown in FIG. 4, for short control frames, A1 field 404 and A2 field 406 may be present, however, SC field 408, A3 field 410, and A4 field 412 may not be present in the short frame format 400.

FIG. 5 illustrates subfields of the 16-bit (2-byte) FC field 402, in accordance with certain aspects of the present disclosure. As shown in FIG. 5, the FC field 402 may include a 2-byte Protocol Version (PV) subfield 502 set to 1 for short control frames. The FC field 402 may further include a 3-bit Type subfield 504 indicating Control type, a 3-bit PTID/Subtype subfield 506, a 3-bit Bandwidth Indication subfield 508, a 1-bit Dynamic Indication subfield 510, a 1-bit Next TWT Info Present subfield 512, a 1-bit More Data subfield 514, a 1-bit Flow Control subfield 516, a Reserved bit 518.

Example Ultra-Low Power Paging Frames

Ultra-low power PHY enables an ultra-low power super-regenerative receiver (e.g., a receiver which consumes less than 200 µA from a 3 volt supply) and, thus, enables a number of ultra-low power use cases which are discussed in more detail below. Additionally, ultra-low power paging frames (e.g., IEEE 802.11 medium access control (MAC) frames) may be defined for use with each of the ultra-low power use cases. The use cases may include primary radio wake-up, Wi-Fi Direct Discovery Assist, Social Wi-Fi Discovery Assist, Association Assist, and Clock Resynchronization.

According to certain aspects, the receivers used for the ultra-low power use cases described herein may not be standalone radios, but may use companion radios along with Wi-Fi radios. In one exemplary non-limiting implementation, the ultra-low power companion radio may operate in sub-1 GHz (S1G) bands (e.g., as described in IEEE 802.11ah) or in the 2.4 GHz band (e.g., as described in IEEE 802.11n). According to certain aspects, the PHY data rate for ultra-low power paging may be 31.25 kb/s. According to certain aspects, the MAC frames defined for ultra-low power paging may be based on short control management frames with Protocol Version 1, for example, as illustrated in FIGS. 4 and 5 above.

According to certain aspects, ultra-low power paging may decrease power consumption and increase battery life in each of the use cases described herein.

According to certain aspects, for ultra-low power paging, a new Frame Control (FC) field format may be defined for Short Control/Management MAC frames. According to certain aspects, the FC field for ultra-low power frames may include a Command subfield when the Subtype subfield in the FC field indicates ultra-low power paging frame. According to certain aspects, the value of the Command subfield notifies the receiver how to parse the remainder of the frame.

FIG. 6 illustrates an example ultra-low power short control frame format 600 for ultra-low power paging, in accordance with certain aspects of the present disclosure. According to certain aspects, the frame can also be a management frame. As shown in FIG. 6, the short control frame format 600 may include a 2-byte frame control field 602. The receiver address field (A1) 604 and transmitter address field (A2) 606 may not be needed, thus, the short control frame format 600 may include 0-, 2-, or 6-byte A1 and A2 fields. The short control frame format 600 may include the 0- or 2-byte Sequence Control field 408, the 0- or 6-byte A3 field 410 and A4 field 412, and variable length Frame Body field 414 as in the example short frame format 400. Since it is a control frame, the FCS field 614 may be sufficiently reliable (e.g., because data is not being sent) with only 1-byte or 2-bytes or, alternatively, the FCS field 614 may be 4-bytes.

Thus, for ultra-low power frames, the FC field may always include the frame control field 602 and the FCS field 616. However, various other fields may either not be included or a different field may be included in their place.

FIG. 7 illustrates a frame control (FC) field 602 format for ultra-low power short control frames 600, in accordance with certain aspects of the present disclosure. As shown in FIG. 7, the FC field 602 may include Protocol Version subfield 502 set to one, Type subfield 504 set to two to indicate control, and a Subtype subfield 706 indicating ultra-low power paging. The FC field 602 may eliminate other subfields that are included in the FC field 402 shown in FIG. 5. Additionally, the FC field 602 may include a Command subfield 708 and a reserved subfield 718 of up to four bits. The Command subfield 708 may be used to provide additional signaling. For example, the Command subfield 708 may signal that the frame is a Primary Radio Wake-up frame, a Clock Resynchronization frame, a Wi-Fi Direct Device Discovery Assist frame, a Social Wi-Fi Discovery Assist frame, or an Association Assist frame.

In some implementations, ultra-low power short control frames may be used between a station and other non-AP stations. In some implementations, ultra-low power short control frames may be used between a station and an AP. According to certain aspects, STAs and/or APs may perform a capability exchange in order to determine whether the STAs and/or APs support ultra-low power communications. For example, whether the receiver is an ultra-low power receiver and whether the transmitter is configured to transmit ultra-low power paging frames.

Primary Radio Wake-Up

According to certain aspects of the present disclosure, a device equipped with a primary radio and an ultra-low power receiver may place the primary radio in a first power state (e.g., low power or sleep state) while listening for signals with the ultra-low power receiver. An ultra-low power short control frame 600 may be used in a network with such a device as a primary radio wake-up frame. That is, another device in the network may send an ultra-low power short control frame 600 to page or wake up the first device. In this case, the Command subfield 708 of the FC field 402 may be set (e.g., Command=0) to indicate that the frame is a wake-up frame.

According to certain aspects of the present disclosure, an AP and a STA in a network may agree on a periodic schedule when the STA is to listen for ultra-low power paging frames. The STA may deactivate the ultra-low power receiver between listening periods of the periodic schedule, e.g., to save more power. In an example implementation, the periodic schedule may be configured according to communications between the AP and STA using the primary radio.

FIG. 8 illustrates an example ultra-low power frame 800 for primary radio wake-up, in accordance with certain aspects of the present disclosure. As shown in FIG. 8, the ultra-low power frame 800 may include the FC field 602 and FCS field 616. Additionally, the ultra-low power frame 800 may include a 2-byte RA field 804 and a 6-byte TA field 806. The RA field 804 may contain the short identifier (SID) of one or more non-AP STAs, for example, the STAs that the transmitting device intends to wake up to listen for a Wi-Fi beacon. The TA field 806 may contain the address of transmitter (e.g., an AP address or basic service set identifier (BSSID)). When an STA receives the wake-up frame, the STA may determine whether its SID matches an SID in the RA field 804 and the TA address matches the BSSID or address of the AP. The STA may then wake up its primary Wi-Fi radio to listen for a primary Wi-Fi beacon.

FIG. 9 illustrates an example ultra-low power frame 900 for primary radio wake up. In another example implementation, the ultra-low power frame 800 for primary radio wake up may omit the TA field 806. Instead, the FCS field 616 may be calculated using the transmitter address and, hence, can be used by a receiving STA to confirm the frame is from the proper AP. This may reduce the size of the frame by 6-bytes.

FIG. 10 illustrates an example ultra-low power frame 1000 for primary radio wake up. In yet another example implementation, a STA may receive wake-up frames from other devices than the associated AP. As shown in FIG. 10, the TA field 806 may be replaced with a Network-Wide Identifier (NWID) field 1006. The NWID may contain a NWID such as an SID, SSID, domain name, or a hashed version of the SID or SSID. According to certain aspects of the present disclosure, a hashed SID or SSID may be hashed with other information to avoid matching with a common SSID (e.g., "Home"). For example, a SID may be hashed with preshared key (PSK) credentials or a domain name. According to certain aspects, the FCS field 616 may be calculated using a transmitter address as in the previous implementation.

This may allow a mobile device (e.g., a smartphone) which is asleep to wander to a new area in the network and then be woken up by another AP in the network. This may also provide network-wide paging where, if there is a message for the mobile device, the mobile device can be woken up and alerted anywhere in the network.

Clock Resynchronization

Clock resynchronization may allow non-AP STAs to resynchronize to the AP clock (e.g., in order to listen for Wi-Fi beacons from the AP). According to certain aspects, ultra-low power frames may be used for clock resynchronization. Resynchronization frames may be sent periodically to avoid allowing the clock in the non-AP STA to drift off too far from the clock in AP. According to certain aspects, the resynchronization frame may be sent during the agreed time window in which a wake-up frame may be sent, so that the non-AP will be in listening mode.

An AP may detect other devices using the radio frequency (e.g., by sensing the carrier). If an AP detects other devices using the radio frequency, the AP may delay transmission of the resynchronization frame from the scheduled transmit time. According to certain aspects of the present disclosure, a field may be included in the frame to allow the non-AP receiving STA to compensate for this delay (e.g., measured in µs).

FIG. 11 illustrates an example ultra-low power frame 1100 for clock resynchronization, in accordance with certain aspects of the present disclosure. As shown in FIG. 1100, the ultra-low power frame 1100 may include FC field 602 and the FCS field 616. The Command subfield 708 of the FC field 602 may be set (e.g., Command=1) to indicate that the ultra-low power frame 1100 is a clock resynchronization frame. The ultra-low power frame 1100 may include the RA field 804 and the TA field 806. The RA field 804 may contain the SIDs of non-AP STAs that are scheduled by the AP to listen for wake-up or resynchronization during the agreed time window. Additionally, the ultra-low power paging frame 1100 may also include a TX Clock LSBs field 1108 that contains the least significant bits (LSBs) of the AP clock. The receiving STA may use the LSBs to correct for AP/STA clock offset. The STA may update its local clock to resynchronize with the AP clock.

Figure 12:
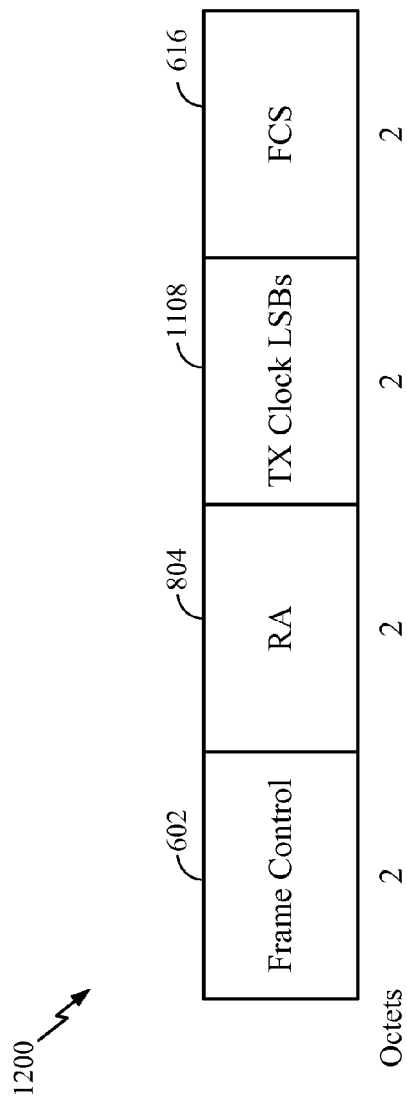

FIG. 12 illustrates an example ultra-low power frame 1200 for clock resynchronization, in accordance with certain aspects of the present disclosure. In another example implementation, the ultra-low power frame 1200 for clock resynchronization may omit the TA field 806. Instead, the FCS field 616 may be calculated using the transmitter address and, hence, the FCS field can be used by a receiving device to confirm the ultra-low power frame is from the proper AP. This may reduce the size of the frame by six bytes.

In yet another example implementation, the STA may receive clock resynchronization frames from other devices than the associated AP. For example, although not shown in FIG. 12, the TA field 806 may be replaced with a NWID field in the example ultra-low power frame 1200.

Wi-Fi Direct Discovery Assist

According to certain aspects, ultra-low power frames may be used for Wi-Fi Direct Discovery Assist. Wi-Fi Direct may be used by STAs (e.g., a laptop, tablet, cell phone, etc.) to communicate directly to other STAs (e.g., a printer, kiosk, etc.). In Wi-Fi Direct Discovery, the STA receiver may have a high duty cycle (e.g., close to 100%). Thus, STAs using Wi-Fi Direct Discovery may benefit from the use ultra-low power discovery assist. For example, this may enable battery-operated Wi-Fi Direct peripherals.

Figure 13:
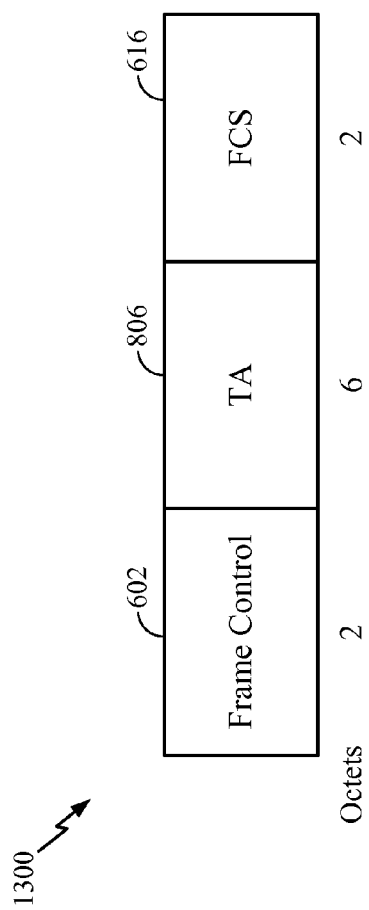
FIG. 13 illustrates an example ultra-low power paging frame for Wi-Fi Direct Discovery Assist, in accordance with certain aspects of the present disclosure.

FIG. 13 illustrates an example ultra-low power frame 1300 for Wi-Fi Direct Discovery Assist, in accordance with certain aspects of the present disclosure. As shown in FIG. 13, the example ultra-low power frame 1300 may include the FC field 602 and the FCS field 616. The Command subfield 708 of the FC field 602 may be set (e.g., Command=2) to indicated that the ultra-low power frame 1300 frame is a Wi-Fi Direct Discovery Assist frame. The ultra-low power frame 1300 frame may include the TA field 806 that contains the address of the transmitting Wi-Fi Direct STA. As shown in FIG. 13, no RA field is needed since the frame is to be used for discovery.

According to certain aspects, once a STA discovers another Wi-Fi Direct device (e.g., by receiving ultra-low power frame 1300 identifying the device in the TA field 806), standard Wi-Fi Direct protocol can take over. According to certain aspects, 5 GHz Wi-Fi devices skip searching on 2.4 GHz periodically.

Social Wi-Fi Discovery Assist

In Social Wi-Fi, portable devices (e.g., STAs) discover other nearby portable devices. The receiver in each STA may listen for frames from other STAs with a high duty cycle (e.g., 100%). According to certain aspects, ultra-low power frames can be used to reduce power consumption in devices performing Social Wi-Fi operations.

An ultra-low power receiver can be on with high duty cycle (e.g. 100%) and listen for ultra-low power discovery assist frames, while allowing the primary radio to spend much of its time in a low-power or sleep mode. The ultra-low power frame for discovery assist may indicate to a receiving STA that there is a nearby social Wi-Fi group and may provide information to the STA regarding a time offset between the ultra-low power frame for discovery assist and the primary radio discovery window.

Figure 14:
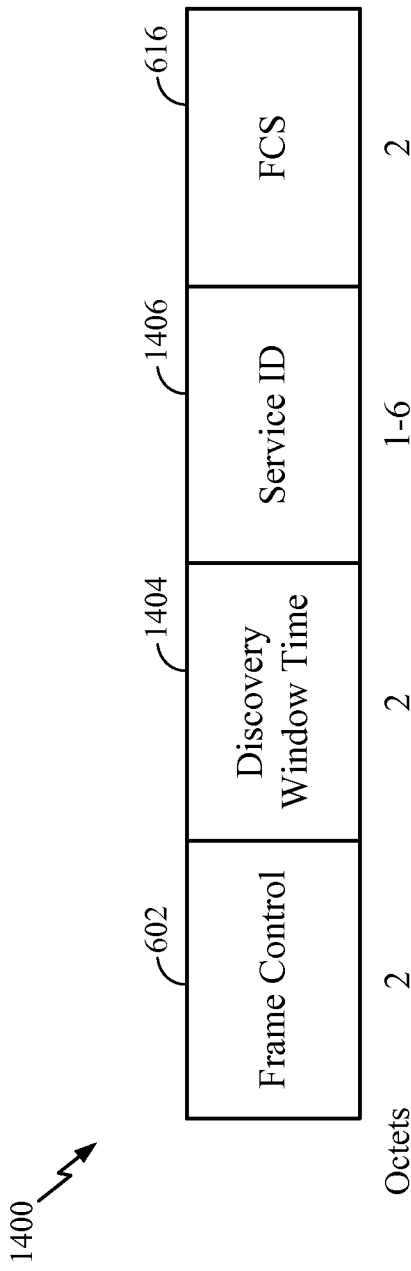
FIG. 14 illustrates an example ultra-low power paging frame for Social Wi-Fi Discovery Assist, in accordance with certain aspects of the present disclosure.

FIG. 14 illustrates an example ultra-low power frame 1400 for Social Wi-Fi Discovery Assist, in accordance with certain aspects of the present disclosure. As shown in FIG. 14, the example ultra-low power frame 1400 for Social Wi-Fi Discovery Assist may include the FC field 602 and FCS field 616. The Command subfield 708 of the FC field 602 may be set (e.g., Command=3) to indicate that example ultra-low power frame 1400 is a Social Wi-Fi Discovery Assist frame. Additionally, the example ultra-low power frame 1400 for Social Wi-Fi Discovery Assist includes a Discovery Window Time field 1404 and a Service ID field 1406. The Discovery Window Time field 1404 indicates the time until the next discovery window (e.g., measured in TUs). The Service ID field 1406 indicates the Social Wi-Fi Service ID. As shown in FIG. 14, the RA field and the TA field are not included. According to certain aspects, when a STA receives the ultra-low power frame 1400, the STA may notify the primary radio and provide the discovery window time and Service ID to the primary radio.

According to certain aspects, the transmitter address may be used to filter out when to notify the primary radio, based on instructions from the primary radio. In the context of Social Wi-Fi, the TA can be 2-bytes (e.g., eliminating the common 3-byte WFA OUI and the 1-byte Social Wi-Fi identifier).

Association Assist

According to certain aspects of the present disclosure, ultra-low power frames can be used for association assist. For example, an AP may broadcast its SSID in ultra-low power frames.

Figure 15:
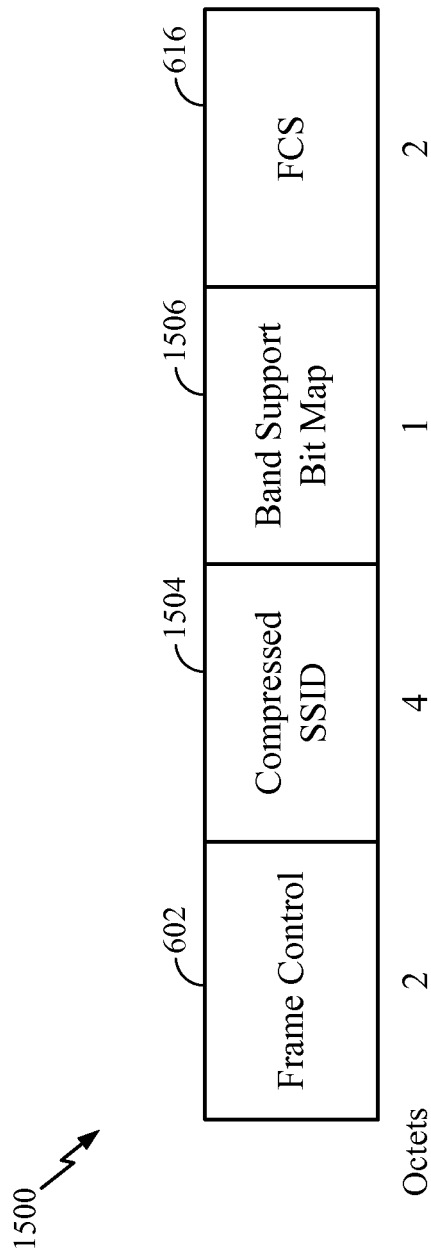
FIG. 15 illustrates an example ultra-low power paging frame for Association Assist, in accordance with certain aspects of the present disclosure.

FIG. 15 illustrates an example ultra-low power frame 1500 for Association Assist, in accordance with certain aspects of the present disclosure. The example ultra-low power frame 1500 may include the FC field 602 and the FCS field 616. The Command subfield 708 of the FC field 602 may be set (e.g., Command=4) to indicate that the example ultra-low power frame 1500 is an Association Assist frame. Additionally, the example ultra-low power frame 1500 may include a Compressed SSID field 1504 and a Band Support Bit Map field 1506. The Compressed SSID field 1504 may contain a 4-byte hash of the network SSID. The Band Support Bit Map field 1506 may indicate which bands the AP supports. As shown in FIG. 15, the A1 and A2 fields may not be needed.

According to certain aspects, when a STA receives ultra-low power frame 1500, the STA may check to see if the SSID (e.g., in the Compressed SSID field 1504) matches any SSIDs in a "List of Relevant SSIDs". According to certain aspects, STAs may maintain (e.g., store in memory) a list of SSIDs of APs of interest (e.g., home, work, etc.) which typically include previously encountered APs or frequently used APs. According to certain aspects, if the SSID in the ultra-low power frame 1500 matches an SSID in the list, the STA may notify the primary radio and forward association assist information to the primary radio. According to certain aspects, the primary radio can then use low duty passive scanning to save power while still finding APs of interest with low latency.

Figure 16:
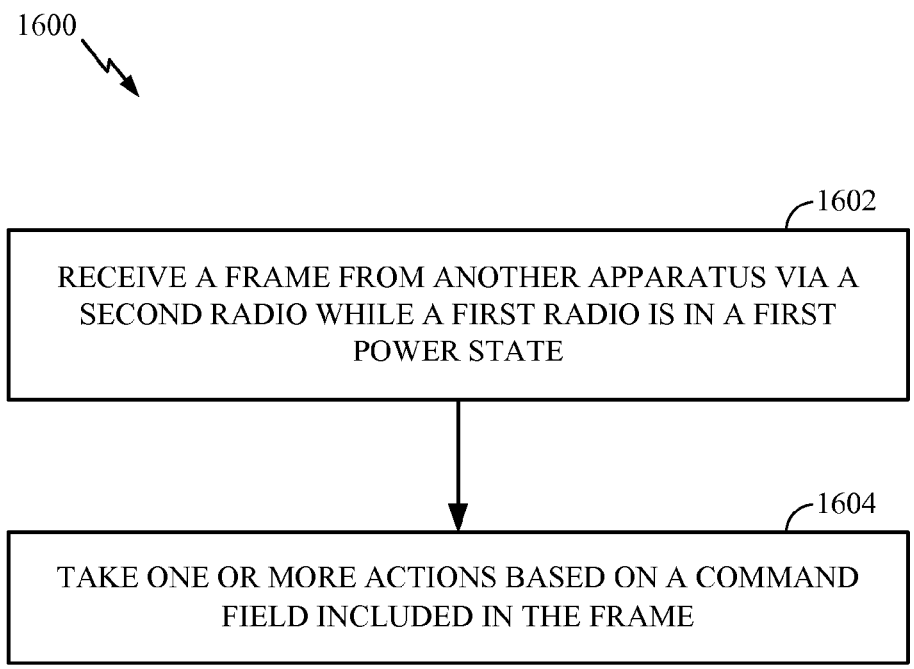
FIG. 16 illustrates example operations for wireless communications, in accordance with certain aspects of the present disclosure.
Figure 16A:
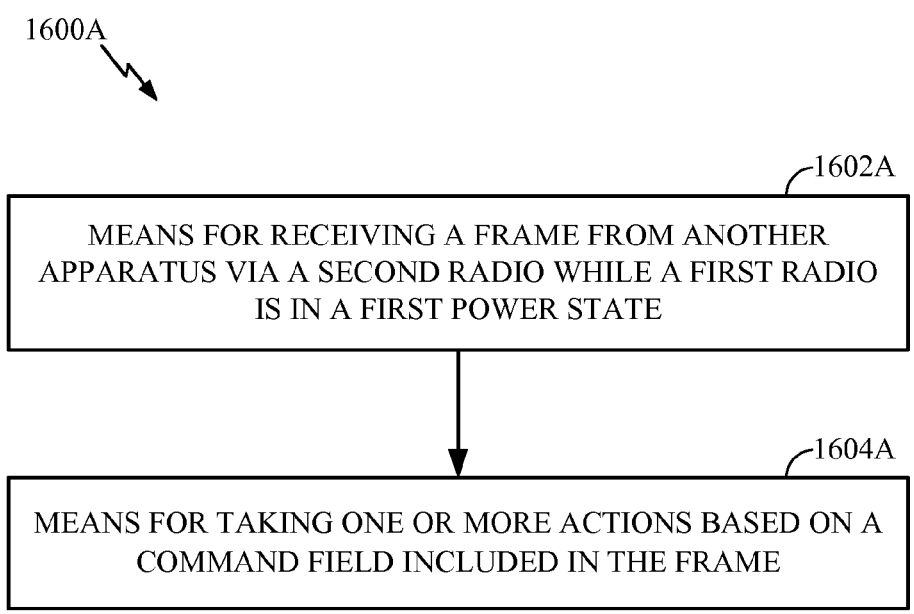
FIG. 16A illustrates example means capable of performing the operations shown in FIG. 16.

FIG. 16 illustrates example operations 1600 for wireless communications, in accordance with certain aspects of the present disclosure. Operations 1600 may be performed, for example, by a UE (e.g., UE 120). Operations 1600 may begin, at 1602, by receiving a frame (e.g., an ultra-low power short MAC paging frame) from another apparatus via a second radio (e.g., a companion radio for ultra-low power paging) while a first radio (e.g., a primary radio) is in a first power state (e.g., a low-power or sleep state).

At 1604, the UE may take one or more actions based on a command field included in the frame (e.g., in the FC field in a MAC header of the frame). According to certain aspects, the FC field may have a subfield (e.g., a Subtype subfield) set to a value that indicates a type of the frame. The UE may parse the command field only if the value indicates the type is a paging frame (e.g., an ultra-low power short MAC frame). According to certain aspects, the frame may also have a FCS field shorter than FCS fields of other types of MAC frames (e.g., 2 bytes). According to certain aspects, the frame may lack a TA field and the UE may calculate a local FCS value, based on a TA of a virtual frame and compare the local FCS value to a value of the FCS field received in the frame.

According to certain aspects, the one or more actions may include causing the first radio to exit the first power state (e.g., wake-up). According to certain aspects, the first radio may provide a configuration to the second radio, and the UE may monitor for frames based on the configuration. The frame may include an RA field and the UE may take the one or more actions only if a SID associated with the UE matches a value of the RA field.

According to certain aspects, the one or more actions may include adjusting a local clock of the UE. For example, the local clock of the UE may be adjusted based on a clock value of a field in the frame (e.g., TX Clock LSBs). In an example implementation, the frame may be received from an AP, and the clock value may be the LSBs of a value of a clock associated with the AP.

According to certain aspects, the command field may indicate the other apparatus is capable of Wi-Fi Direct. In this case, the one or more actions may include causing the first radio to exit the first power state so the UE can communicate with the other apparatus via Wi-Fi Direct. For example, the second radio may notify the first radio that the other apparatus is capable of Wi-Fi Direct.

According to certain aspects, the command field may indicate the other apparatus is associated with a social group. In this case, the one or more actions may include causing the first radio to exit the first power state so the UE can listen for a discovery frame sent by a member of the social group. In an example implementation, the frame may include a field (e.g., a Discovery Time Window field) that indicates a time offset, relative to a transmission time of the frame, corresponding to a next discovery window for the UE to listen for discovery frames sent by a member of the social group. The frame may also include a field that indicates a service ID (e.g., a Service ID field) of the other apparatus. The UE may determine whether the service ID of the other apparatus matches a service ID in a list of service IDs and cause the first radio to exit the first power state based on the determination.

According to certain aspects, the frame may include a field with association assist information. In this case, the one or more actions may include causing the first radio to exit the low power state to attempt association with the other apparatus using the association assist information. For example, the association assist information may include an SSID of the other apparatus and the UE may associate with the other apparatus only if the indicated SSID is in a list of relevant SSIDs (e.g., based on previous associations) stored at the UE. The association assist information may also include one or more frequency bands supported by the other apparatus and the UE may determine that the UE supports at least one of the one or more frequency bands and cause the first radio to exit the first power state (e.g., wake up) based on the determination.

According to certain aspects, the UE may determine that the other apparatus transmits low-power frames and monitor for low-power frames based on the determination. For example, the UE may perform a capability exchange with the other apparatus to determine that the apparatuses support ultra-low power frames. As part of the capability exchange, the UE may receive an indication from the other apparatus that the other apparatus transmits low-power frames and the UE may provide an indication that the UE is capable of receiving low-power frames.

Figure 17:
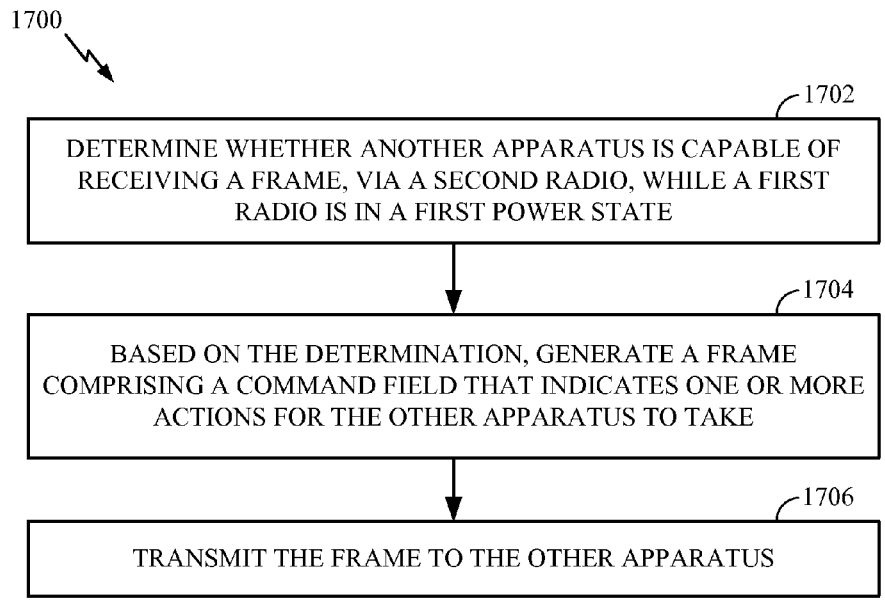
FIG. 17 illustrates example operations for wireless communications, in accordance with certain aspects of the present disclosure.
Figure 17A:
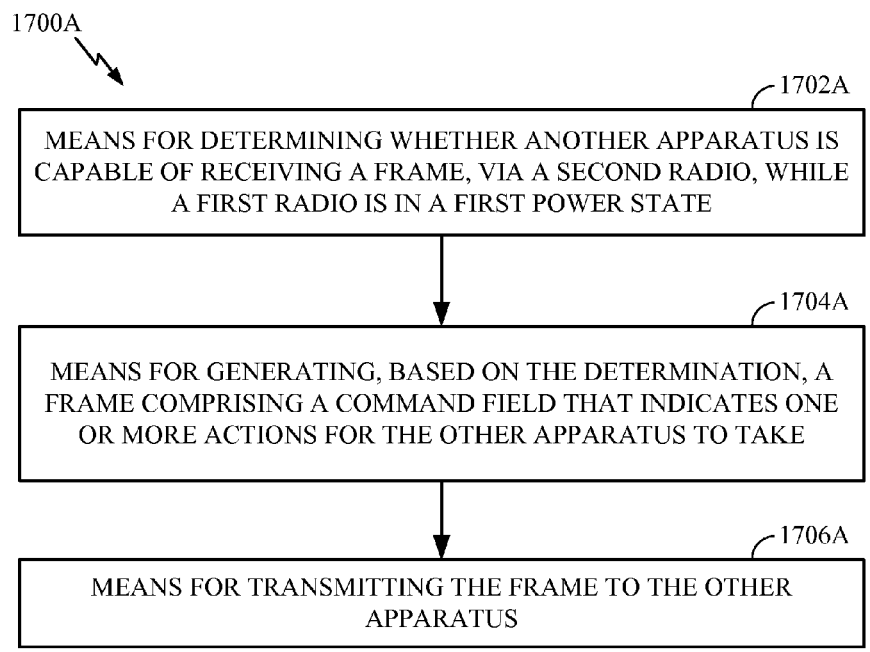
FIG. 17A illustrates example means capable of performing the operations shown in FIG. 17.

FIG. 17 illustrates example operations 1700 for wireless communications, in accordance with certain aspects of the present disclosure. Operations 1700 may be performed, for example, by an apparatus (e.g., UE 120 or AP 110). Operations 1700 may begin, at 1702, by determining whether another apparatus (e.g., a UE) is capable of receiving a frame, via a second radio, while a first radio is in a first power state. For example, the apparatus may receive, as part of a capability exchange, capability information from the other apparatus indicating the other apparatus is capable of receiving low-power paging frames.

At 1704, based on the determination, the apparatus may generate a frame (e.g., an ultra-low power short MAC paging frame) comprising a command field (e.g., in the FC of the MAC header) that indicates one or more actions for the other apparatus to take. According to certain aspects, the FC field of the frame may have a subfield (e.g., a Subtype subfield) set to a value that indicates a type of the frame. The frame may be a control frame or a management frame. According to certain aspects, the frame may also have a FCS field shorter than FCS fields of other types of MAC frames (e.g., 2 bytes). According to certain aspects, the frame may lack a TA field and a RA field. According to certain aspects, the frame may include a network-wide identifier (NWID) field set to a value (e.g., SSID, SID, hashed version of an SID, hashed version of an SSID) that identifies a network to which the apparatus is associated.

At 1706, the apparatus may transmit the frame to the other apparatus. According to certain aspects, the one or more actions may comprise causing the first radio to exit the first power state. According to certain aspects, the frame may include a RA field and the one or more action may include determining whether a SID associated with the other apparatus matches a value of the RA field and the one or more actions may include adjusting a local clock of the other apparatus. For example, the local clock of the other apparatus may be adjusted based on a clock value (e.g., LSBs of a value of a clock associated with the apparatus) of a field in the paging frame.

According to certain aspects, the command field may indicate the apparatus is capable of Wi-Fi Direct. In this case, the one or more actions may include causing the first radio to exit the first power state so the other apparatus can communicate with the apparatus via Wi-Fi Direct. For example, the apparatus may notify the first radio that the other apparatus is capable of Wi-Fi Direct.

According to certain aspects, the command field may indicate the apparatus is associated with a social group. In this case, the one or more actions may include causing the first radio to exit the first power state so the other apparatus can listen for a discovery frame sent by a member of the social group. In an example implementation, the frame may include a field (e.g., Discovery Time Window field) that indicates a time offset, relative to a transmission time of the frame, corresponding to a next discovery window for the apparatus to listen for discovery frames sent by a member of the social group. The frame may also include a field that indicates a service ID (e.g., Service ID field) of the other apparatus and the apparatus may determine whether the service ID of the other apparatus matches a service ID in a list of service IDs, and cause the first radio to exit the low power state based on the determination.

According to certain aspects, the paging frame may include a field with association assist information. In this case, the one or more actions may include causing the first radio to exit the low power state to attempt association with the apparatus using the association assist information. For example, the association assist information may include a SSID of the apparatus and the other apparatus may associate with the apparatus only if the indicated SSID is in a list of relevant SSIDs (e.g., based on previous associations) stored at the other apparatus. The association assist information may also include one or more frequency bands supported by the apparatus.

Lightweight Frame Authentication Code

According to certain aspects of the present disclosure, ultra-low power frames may include a lightweight frame authentication code (FAC) used for authenticating the frames. For example, an AP may include a FAC in a wake-up frame (e.g., the wake-up frames illustrated in FIGS. 8-10), and a receiving STA may use the FAC to authenticate the received frame before waking up a primary radio of the STA. In a second example, an AP may include a FAC in a clock resynchronization frame (e.g., the clock resynchronization frames illustrated in FIGS. 11-12), and a receiving STA may use the FAC to authenticate the received frame before using time information in the clock resynchronization frame to resynchronize a clock of the STA.

According to aspects of the present disclosure, a malicious or malfunctioning network device may continuously send wake-up frames to a STA. Reception of the wake-up frames may cause a receiving STA to cause a primary receiver of the STA to exit a low power state (e.g., a sleep state). Reception of the wake-up frames may cause the STA to cause the primary receiver to exit the low power state even though there are no radio signals to be received by the primary receiver. A STA that activates a primary receiver too often or for too long may consume additional power, possibly draining a battery of the STA and/or causing the STA to lose functionality.

According to aspects of the present disclosure, a Frame Check Sequence (FCS) field (e.g., FCS field 616 shown in FIGS. 8-12) of a frame may be replaced by a Frame Authentication Code (FAC) field in order to allow a receiving device to authenticate the message. In traditional wireless communications protocols (e.g., Wi-Fi), a random number or a sequence number is required to be sent in each frame in order to prevent a replay attack against the wireless communications system. When an attacker replays (i.e., transmits a copy of) a previously transmitted frame, the receiver determines that the random number or sequence number field in the replayed frame is incorrect (e.g., used in a previously received frame) and ignores the replayed frame.

Figure 18:
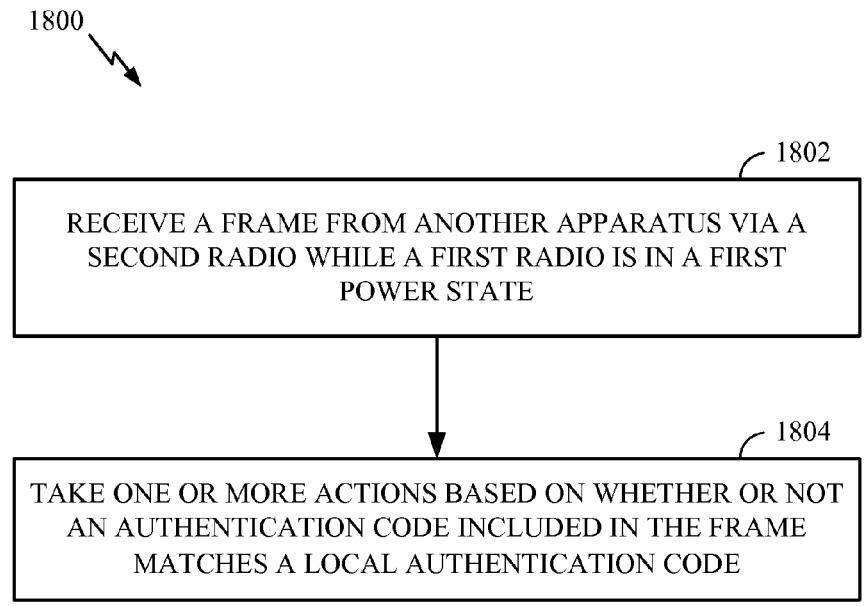
FIG. 18 illustrates example operations for wireless communications, in accordance with certain aspects of the present disclosure.
Figure 18A:
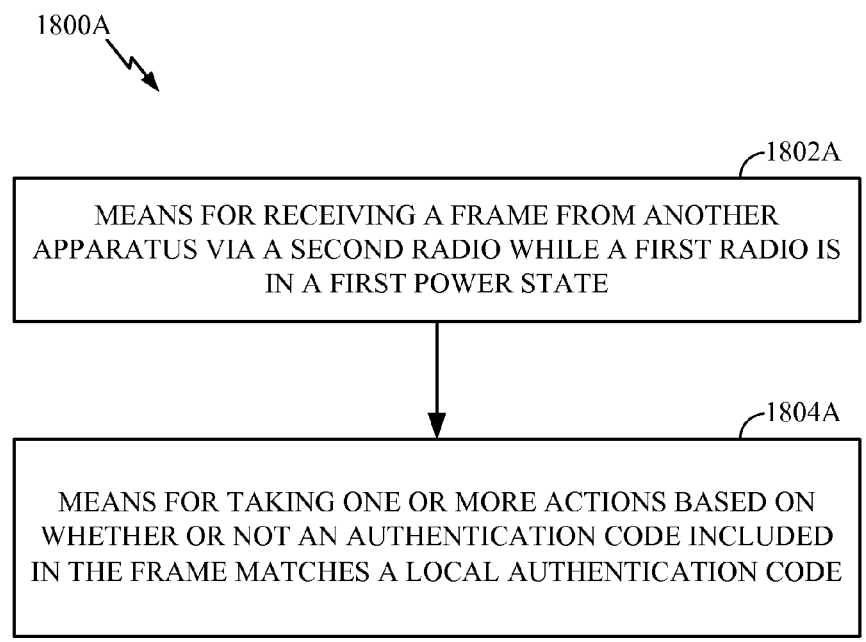
FIG. 18A illustrates example means capable of performing the operations shown in FIG. 18.

FIG. 18 illustrates example operations 1800 for wireless communications performed by an apparatus, in accordance with certain aspects of the present disclosure. Operations 1800 may be performed, for example, by a STA or UE (e.g., UE 120, shown in FIGS. 1 and 2). Operations 1800 may begin, at 1802, by the apparatus receiving a frame (e.g., an ultra-low power short MAC paging frame) from another apparatus via a second radio (e.g., a companion radio for ultra-low power paging) while a first radio (e.g., a primary radio) is in a first power state (e.g., a low-power or sleep state).

At 1804, the apparatus may take one or more actions based on whether or not an authentication code included in the frame matches a local authentication code. For example, a UE may determine a FAC extracted from a received ultra-low power wake-up frame matches a local FAC computed by the UE, and then activate (e.g., "wake up") a primary radio of the UE. In the example, if the UE had determined that the extracted FAC did not match the local FAC, the UE might discard the received ultra-low power wake-up frame.

According to certain aspects, an FC field (e.g., the FC field 602 shown in FIGS. 8-12) of a frame may have a subfield (e.g., a Subtype subfield) set to a value that indicates a type of the frame. A receiving apparatus (e.g., a STA or UE) may parse the command field only if the value indicates the type is a paging frame (e.g., an ultra-low power short MAC frame). According to certain aspects, the frame may lack a TA field (e.g., the TA field 806 shown in FIGS. 8 and 11), and the receiving apparatus may calculate a local authentication code (e.g., a local FAC), based on a TA received in a previous communication, and compare the local authentication code to a value of the authentication code (e.g., a FAC) received in the frame.

According to certain aspects, the one or more actions may include causing the first radio to exit the first power state (e.g., wake-up). According to certain aspects, the first radio may provide a configuration to the second radio, and the UE may monitor for frames based on the configuration. The frame may include an RA field and the UE may take the one or more actions only if a SID associated with the UE matches a value of the RA field.

According to aspects of the present disclosure, a FAC field included in an ultra-low power frame may rely on (e.g., be determined based on a function of) a dynamic key. Using a dynamic key may allow for a reduced frame size, as compared to keys used in other types of wireless security protocols, and the reduced frame size may reduce the energy (e.g., battery power) used to generate and receive the frame.

According to aspects of the present disclosure, a key k used to generate a FAC may be dynamic, e.g., the key may be updated each time wake-up of a STA succeeds.

According to aspects of the present disclosure, a key k used to generate a FAC may be chosen to be small to reduce the size of the algorithm used by a receiver.

According to aspects of the present disclosure, a FAC can be pre-computed (e.g., before receiving or transmitting a frame including the FAC) in a primary radio, because the FAC does not vary for a period of time.

According to aspects of the present disclosure, a FAC may be dependent on a transmitter address (TA) of a transmitter. A TA field (e.g., the TA field 806 shown in FIGS. 8 and 11) may not be required in a frame including a FAC field because the FAC is dependent on the TA, and a frame sent by a transmitter with an incorrect TA will have a FAC that does not match the local FAC at the receiver (e.g., pre-computed by the receiver, in, e.g., the primary radio), and the frame will therefore not be accepted by the receiver.

According to aspects of the present disclosure, an RA used by a station while receiving ultra-low power frames can be temporary and agreed upon (e.g., by a STA and an AP) during a previous communication session between a transmitter and a receiver. Allowing the RA to be temporary and resetting it after each communications session may improve privacy of communications in a wireless network.

According to aspects of the present disclosure, a FAC may be pre-computed in an apparatus and transmitted to a second apparatus, rather than the second apparatus computing a FAC. That is, an AP may determine a value (e.g., a password or magic number) to be used as a FAC in an ultra-low power frame the next time the AP wakes up a STA, and the AP can transmit the value to the STA in a current communication session with the STA. The AP and STA both store the value (i.e., the password or magic number), and the STA places the primary radio of the STA in the low power state.

Alternatively, the STA may determine a value (e.g., a password or magic number) to be used as a FAC in an ultra-low power frame the next time the AP wakes up a STA, and the STA can transmit the value to the AP in a current communication session with the AP. The AP and STA both store the value (i.e., the password or magic number), and the STA places the primary radio of the STA in the low power state.

The STA then listens for ultra-low power frames using a secondary radio and ignores any ultra-low power frames that do not include the stored value in a FAC field. When the AP needs to communicate with the STA, the AP transmits an ultra-low power frame including the stored value in a FAC field. When the STA receives the ultra-low power frame with the value in the FAC field, the STA takes the primary radio out of the low power state and establishes a communication session with the AP. During the communication session, the AP determines a new value (e.g. a new password or magic number) and transmits the new value to the STA before the communication session ends and the STA places the primary radio into a low power state.

Figure 19:
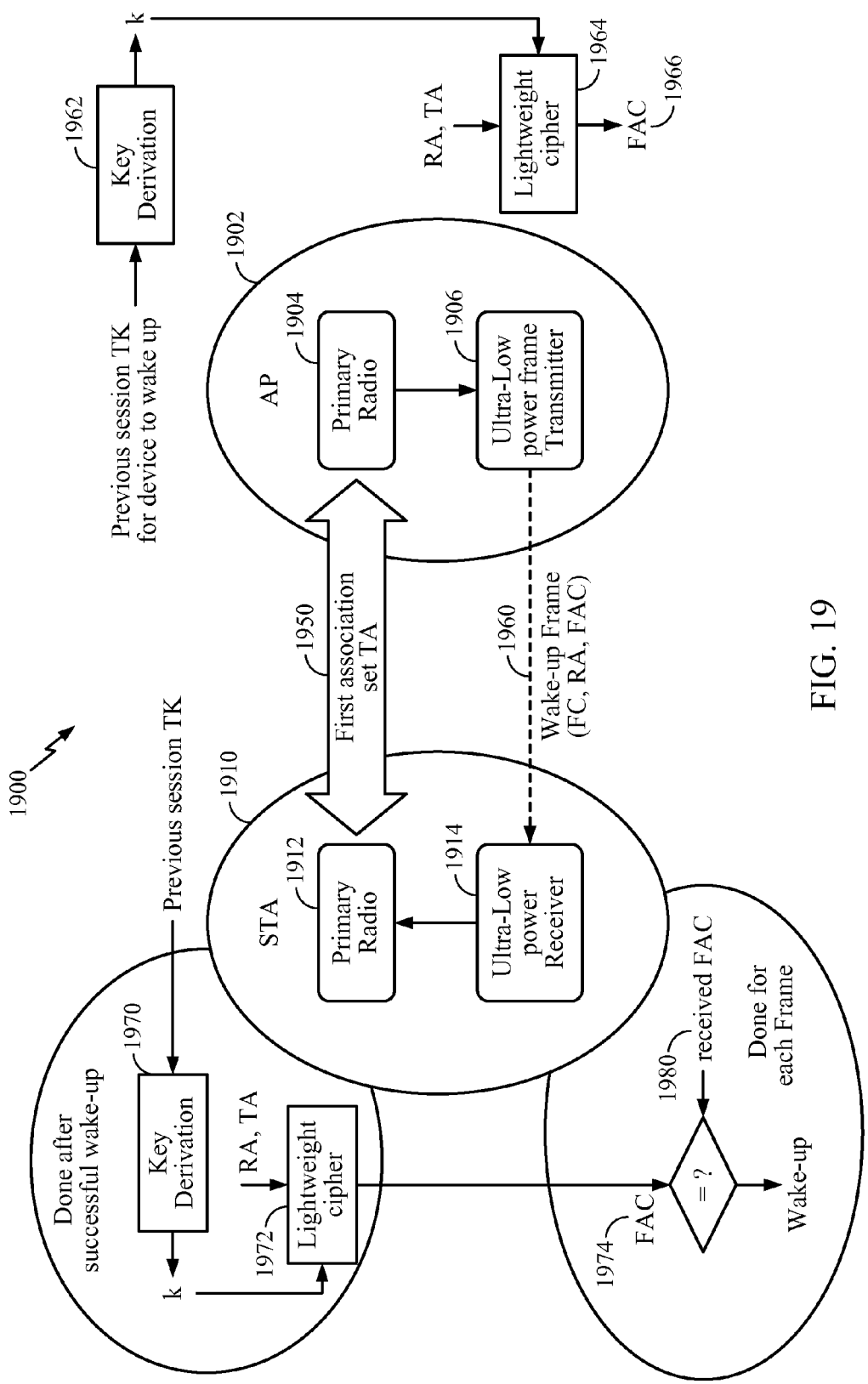
FIG. 19 illustrates an exemplary communication system in which techniques of the present disclosure may be practiced.

FIG. 19 illustrates an exemplary communication system 1900 in which techniques for using ultra-low power wake-up frames including frame authentication code (FAC) fields may be practiced, according to aspects of the present disclosure. The exemplary communication system includes an AP 1902, which may be AP 110, illustrated in FIG. 1. The system also includes a STA 1910, which may be a user terminal such as user terminals 120a, 120c, 120m, and 120x illustrated in FIGS. 1-2. While the exemplary system shows only a single STA, the disclosure is not so limited, and other numbers of STAs may be included in such a system.

AP 1902 includes a primary radio 1904 and an ultra-low power frame transmitter 1906, although in some embodiments, the functions of the primary radio and ultra-low power frame transmitter are performed by a single radio. The AP may also include other components (see FIG. 2). Similarly, STA 1910 includes a primary radio 1912 and an ultra-low power receiver 1914, and may include other components (see FIG. 2).

Exemplary operations involving an ultra-low power wake-up frame will now be described, with reference to FIG. 19.

The STA 1910 may associate at 1950 with the AP 1902 via their respective primary radios 1912 and 1904. The association may be via Wi-Fi signaling, although other wireless communications technologies may be used. The AP and STA agree on a transient key (TK) to secure the communications of the association as part of the association process. The AP informs the STA of a transmitter address (TA) to be used by the AP when the AP transmits wake-up frames and other communications to the STA. The AP and STA may also exchange information on a periodic schedule to be used by the STA to listen for wake-up frames from the AP. The AP may assign the STA to a periodic schedule. Additionally or alternatively, the STA may request a periodic schedule, which the AP may agree to, or the AP may suggest another schedule.

After completion of communications during the first association, the STA may go into a sleep or low-power mode. While in the low-power mode, the STA may deactivate the primary radio of the STA and periodically deactivate and reactivate the ultra-low power receiver of the STA. The STA periodically reactivates the ultra-low power receiver on the periodic schedule determined according to the communications exchanged with the AP during the first association 1950.

When the AP determines to communicate with the STA (e.g., the AP has data to send to the STA), the AP determines the next time that the STA will activate the ultra-low power receiver of the STA, based on the previously exchanged information regarding the schedule. The AP generates a wake-up frame including a frame control (FC) field, a receiver address (RA) field including the RA of the STA, and a frame authentication code (FAC) field. At a time determined according to the periodic schedule, the AP transmits, at 1960, the wake-up frame to the STA.

The FAC may be calculated by the AP based on the TK of the previous session (e.g., the first association with the STA), the TA of the AP, and the RA of the STA. Calculation of the FAC starts with deriving a key, k, from the TK used in a previous session, at 1962. The derivation of k from the TK may be performed by using a strong hashing algorithm (e.g., SHA256, SHA3) on the TK, although any of a number of mathematical functions known in the art may be used to derive k from the TK.

The key, k, is then used as a key in a lightweight cipher algorithm 1964 that is used to encipher the TA and RA. The output of enciphering the TA and RA with k is the FAC 1966. When it is the correct time to transmit the wake-up frame, the AP transmits the wake-up frame, including the FC, RA, and FAC fields, as described above.

As described above, the STA 1910 associates with the AP 1902 and acquires the TK, TA, and periodic schedule. The STA may then deactivate the primary radio 1912 and ultra-low power receiver 1914. After the STA receives the TK (e.g., during the association with the AP), the STA may derive a lightweight key, k, from the TK at 1970. The STA uses the same derivation function to derive k as the AP uses at 1962, and thus the k derived by the STA is identical to the k derived by the AP. The key, k, is then used by the STA as a key in a lightweight cipher algorithm 1972 that is used to encipher the TA and RA. The lightweight cipher algorithm 1972 is identical to the lightweight cipher algorithm 1964 used by the AP. The output of enciphering the TA and RA with k is the local FAC 1974. Because the key k, RA, TA, and lightweight cipher algorithms used by the AP and STA are identical, the local FAC 1974 computed by the STA is identical to the FAC 1966 computed by the AP.

The STA activates the ultra-low power receiver according to the periodic schedule. When the ultra-low power receiver is active, the STA may receive one or more frames. For each frame the STA receives, the STA determines if the FC field indicates the frame is a wake-up frame and if the RA field of the frame matches the RA of the STA. If the FC field indicates the frame is a wake-up frame and the RA matches, then the STA extracts a FAC from the frame and compares the value 1980 of the received FAC to the local FAC 1974 calculated by the STA. If the value of the received FAC matches the local FAC, then the STA obeys any command indicated by the FC field of the frame, e.g., the STA may activate or "wake up" the primary radio of the STA and attempt to communicate with the AP via the primary radio. If the value of the received FAC does not match the local FAC, then the STA discards the frame as being invalid. For example, a frame may have been sent by a malicious device, but, because the malicious device does not have the TK, the malicious device includes a "wrong" FAC in the frame, and the STA determines to ignore the frame.

According to aspects of the present disclosure, an adversary has only a limited time to attempt a "brute force attack" on the security provided by the k/FAC technique between two valid wake-up frames. To be successful, an attacker would need to guess the FAC, or equivalently k, and transmit a frame using the guessed FAC during one of the time periods that the STA is scheduled to activate the ultra-low power receiver. In addition, the attacker must guess the FAC before the AP wakes up the STA, because the STA and AP determine a new TK, and hence, a new k and FAC, when the STA wakes up. In addition, replay attacks may also be prevented because k changes after each successful wake-up.

According to aspects of the present disclosure, the size of the FAC field may be determined based on a ratio of average time between incidents of a receiver waking up and the period of the cycle followed for activating the receiver to listen for a wake-up signal. For example, if a receiver listens for a wake-up signal once every 500 ms (e.g., to allow a low communication latency), and the receiver wakes up an average of once per hour (i.e., 3600 seconds), then the ratio is 3600/0.5. In the example, on average, an attacker would have 7200 opportunities to guess the FAC before the STA woke up, communicated with the AP, determined a new k and local FAC, and the attacker would be required to start the guessing process over again. According to aspects of the present disclosure, the FAC should have a search space at least double the number of opportunities for an attacker to guess before starting over. In the example, the search space should be at least 14,400 (7,200 doubled) possible FAC values, and a size of the FAC field may be set to two bytes, allowing for 65,536 possibilities.

Figure 20:
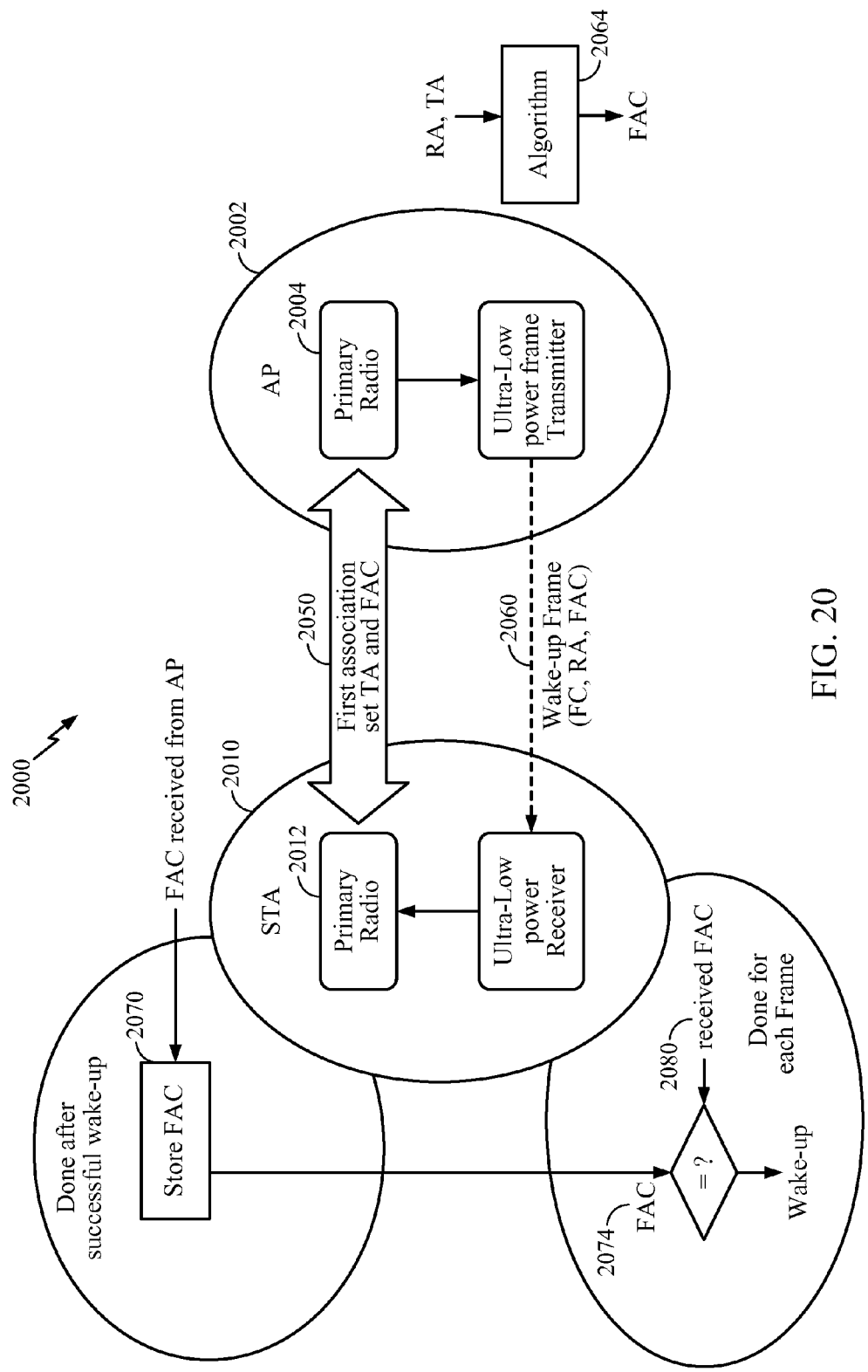
FIG. 20 illustrates an exemplary communication system in which techniques of the present disclosure may be practiced.

FIG. 20 illustrates an exemplary communication system 2000 in which techniques for using ultra-low power wake-up frames including frame authentication code (FAC) fields may be practiced, according to aspects of the present disclosure. In the exemplary communication system 2000, an AP supplies a value (e.g., a password or magic number) to be used as a FAC to a STA. The AP and the STA store the FAC for use in transmitting and receiving ultra-low power wake-up frames. Otherwise, communication system 2000 uses similar equipment in similar ways to communication system 1900, and the description of communication system 2000 will focus on differences from communication system 1900.

Differences in operation between communication system 2000 and communication system 1900 will now be described, with reference to FIG. 20.

The AP may determine a value (e.g., a password or magic number) to be used in a FAC field of an ultra-low power frame using any of a number of known algorithms at 2064. The value may be calculated by the AP based on the TK of the previous session (e.g., the first association with the STA), the TA of the AP, and the RA of the STA as in FIG. 19, for example. Unlike in FIG. 19, the AP transmits the FAC value to the STA during the association at 2050.

As in FIG. 19, when the AP generates a wake-up frame for the STA, the wake-up frame includes an FC field, an RA field, and a FAC field. The FAC is the same FAC that the AP previously transmitted to the STA during the association 2050. At a time determined according to the periodic schedule, the AP transmits, at 2060, the wake-up frame to the STA.

The STA 2010 associates with the AP 2002 at 2050 and receives the TA, periodic schedule, and FAC via transmissions from the AP during the association. After the STA receives the FAC, the STA stores the FAC at 2070. The stored FAC is used as the local FAC 2074 by the STA.

As in FIG. 19, if the STA receives a wake-up frame for the STA, then the STA extracts a FAC from the frame and compares the value 2080 of the received FAC to the local FAC 2074. If the value of the received FAC matches the local FAC, then the STA treats the wake-up frame as valid, otherwise the STA treats the wake-up frame as invalid and discards it.

According to aspects of the present disclosure, a malicious or malfunctioning network device may send clock resynchronization frames to a STA. Reception of the clock resynchronization frames may cause a receiving STA to synchronize a clock of the STA to a time of the malicious or malfunctioning device that is different from the time of an AP serving the STA. If a STA synchronizes a clock of the STA to a time that is different from an AP serving the STA, the STA may activate one or more receivers at one set of times (e.g., on a periodic schedule) while the AP serving the STA is transmitting signals to the STA at a different set of times (e.g., on the same periodic schedule, but at different times). For example, a STA may activate a receiver on a schedule to listen for wake-up frames from a serving AP. In the example, the STA may have become desynchronized from the AP due to clock resynchronization frames from a malicious AP. In the example, the STA does not activate the receiver at times that the AP is transmitting wake-up frames, causing the STA to miss data transmissions from the AP.

According to aspects of the present disclosure, an AP may include a frame authentication code (FAC) in a clock resynchronization frame to secure the clock resynchronization frame. A STA receiving the clock resynchronization frame may use the included FAC to authenticate that the clock resynchronization frame is from the correct AP before synchronizing a clock of the STA to a time value in the clock resynchronization frame.

Figure 21:
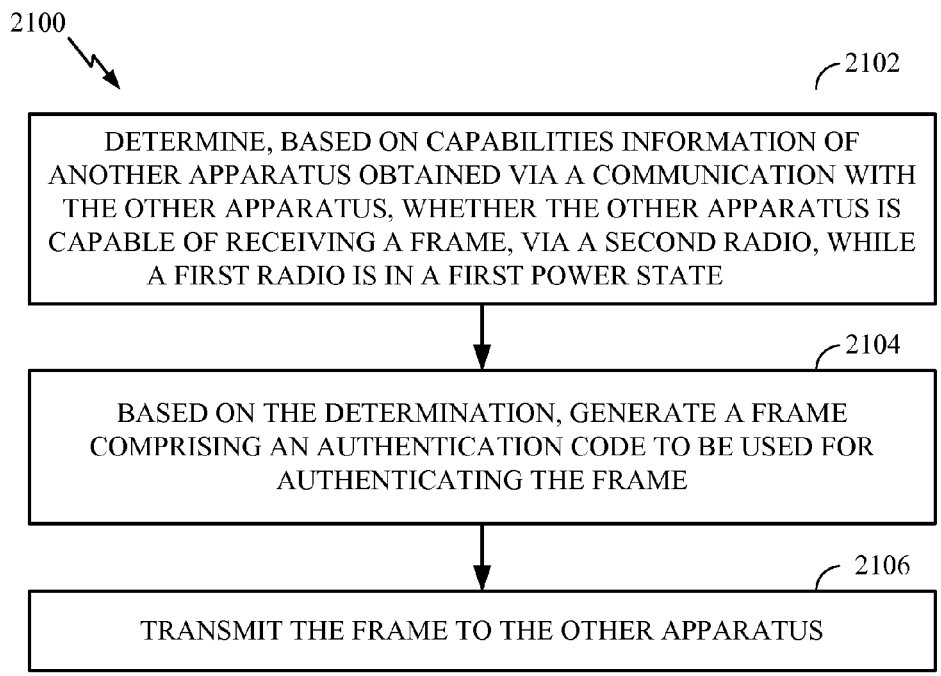
FIG. 21 illustrates example operations for wireless communications, in accordance with certain aspects of the present disclosure.
Figure 21A:
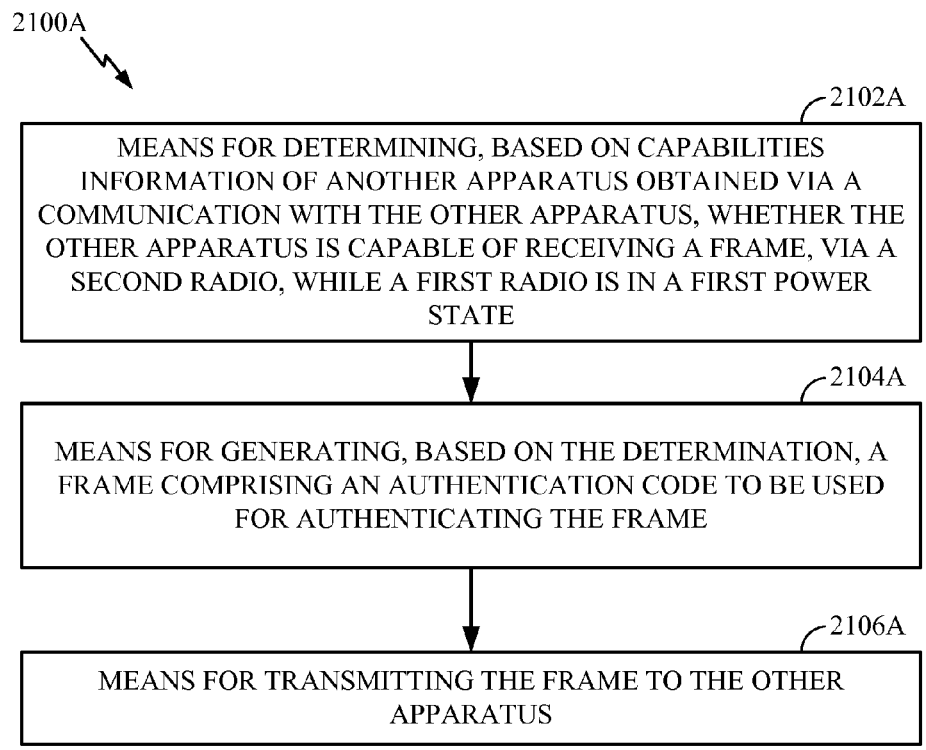
FIG. 21A illustrates example means capable of performing the operations shown in FIG. 21.

FIG. 21 illustrates example operations 2100 for wireless communications, in accordance with certain aspects of the present disclosure. Operations 2100 may be performed, for example, by an apparatus (e.g., UE 120 or AP 110). Operations 2100 may begin, at 2102, by determining, based on capabilities information of another apparatus obtained via a communication with the other apparatus, whether the other apparatus (e.g., a UE) is capable of receiving a frame, via a second radio, while a first radio is in a first power state. For example, the apparatus may receive, as part of a capability exchange, capability information from the other apparatus indicating the other apparatus is capable of receiving low-power paging frames.

At 2104, based on the determination, the apparatus may generate a frame (e.g., an ultra-low power short MAC paging frame) comprising an authentication code (e.g., a FAC) to be used for authenticating the frame. According to certain aspects, the FC field (e.g., the FC field 602 shown in FIGS. 8-12) of the frame may have a subfield (e.g., a Subtype subfield) set to a value that indicates a type of the frame. The frame may be a control frame or a management frame. According to certain aspects, the frame may include a network-wide identifier (NWID) field set to a value (e.g., SSID, SID, hashed version of an SID, hashed version of an SSID) that identifies a network to which the apparatus is associated.

At 2106, the apparatus may transmit the frame to the other apparatus. According to certain aspects, the frame may include a RA field (e.g., the RA field 804 shown in FIGS. 8-12) and the other apparatus may determine whether a SID associated with the other apparatus matches a value of the RA field before taking any action. For example, the local clock of the other apparatus may be adjusted based on a clock value (e.g., LSBs of a value of a clock associated with the apparatus) of a field in the frame, if the RA in the frame matches a SID of the other apparatus.

Figure 22:
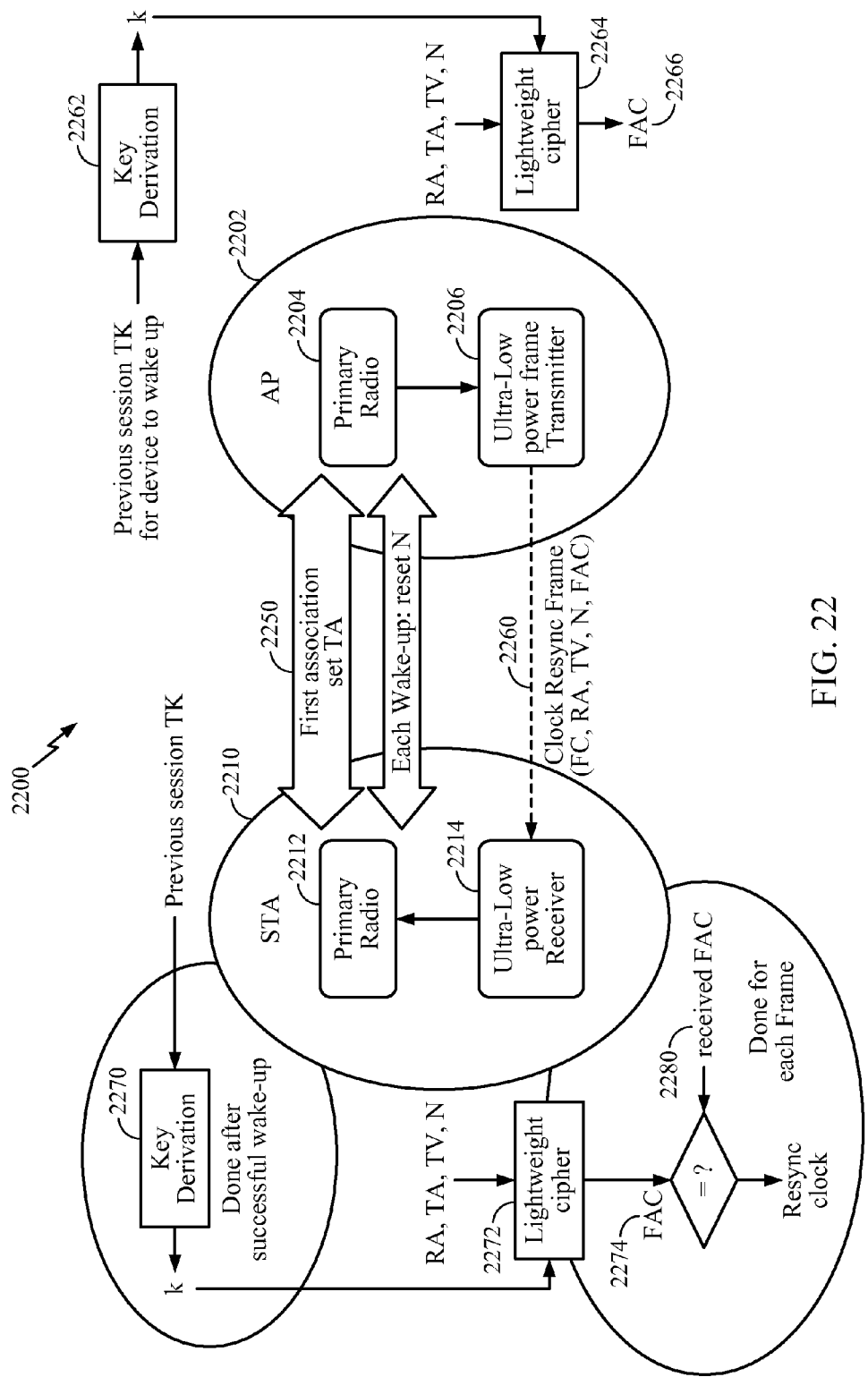
FIG. 22 illustrates an exemplary communication system in which techniques of the present disclosure may be practiced.

FIG. 22 illustrates an exemplary communication system 2200 in which techniques for using ultra-low power clock resynchronization frames including frame authentication codes (FACs) may be practiced, according to aspects of the present disclosure. The communication system includes an AP 2202, which may be AP 110, illustrated in FIG. 1. The system also includes a STA 2210, which may be a user terminal such as user terminals 120a and 120c illustrated in FIG. 1 and user terminals 120m and 120x illustrated in FIG. 2. While the exemplary system shows only a single STA, the disclosure is not so limited, and other numbers of STAs may be included in such a system.

AP 2202 includes a primary radio 2204 and an ultra-low power frame transmitter 2206, although in some embodiments, the functions of the primary radio and ultra-low power frame transmitter are performed by a single radio. The AP also includes other components (see FIG. 2). Similarly, STA 2210 includes a primary radio 2212 and an ultra-low power receiver 2214, as well as other components (see, e.g., FIG. 2).

Exemplary operations for authenticating an ultra-low power clock resynchronization frame using a FAC will now be described, with reference to FIG. 22.

The STA 2210 may associate at 2250 with the AP 2202 via their respective primary radios 2212 and 2204. The association may be via Wi-Fi signaling, although other wireless communications technologies may be used. The AP and STA agree on a transient key (TK) to secure the communications of the association as part of the association process. The AP informs the STA of a transmitter address (TA) to be used by the AP when the AP transmits clock resynchronization frames and other communications to the STA. The AP and STA may also exchange information on a periodic schedule to be used by the STA to listen for wake-up frames, clock resynchronization frames, and other communications from the AP. The AP may assign the STA to a periodic schedule. Alternatively or additionally, the STA may request a periodic schedule, which the AP may agree to, or the AP may suggest another schedule. The AP and STA also initialize or reset a sequence number N during the association. For example, the AP and STA may each set a sequence number N to a value of zero during the association.

After completion of communications during the first association, the STA may go into a sleep or low-power mode. While in the low-power mode, the STA may deactivate the primary radio of the STA and periodically deactivate and reactivate the ultra-low power receiver of the STA. The STA periodically reactivates the ultra-low power receiver on the periodic schedule determined according to the communications exchanged with the AP during the first association 2250.

When the AP determines to resynchronize the clock of the STA to the clock of the AP (e.g., the AP has determined that the clock of the STA may have drifted by a threshold amount since a most recent resynchronization, or a predetermined period of time has passed since a most recent resynchronization), the AP determines the next time that the STA will activate the ultra-low power receiver of the STA, based on the previously exchanged information regarding the periodic schedule. The AP then generates a clock resynchronization frame including a frame control (FC) field, a receiver address (RA) field including the RA of the STA, a time value (TV) field including a time value to be used by the STA to resynchronize the clock of the STA, a sequence number field including the sequence number N, and a frame authentication code (FAC) field. At a time determined according to the periodic schedule, the AP transmits, at 2260, the clock resynchronization frame to the STA.

The FAC is calculated by the AP based on the TK of the previous session (e.g., the first association with the STA), the TA of the AP, the TV, the sequence number N, and the RA of the STA. Calculation of the FAC starts with deriving a key, k, from the TK used in a previous session, at 2262. The derivation of k from the TK may be performed by using a strong hashing algorithm (e.g., SHA256, SHA3) on the TK, although any of a number of mathematical functions known in the art may be used to derive k from the TK.

The key, k, is then used as a key in a lightweight cipher algorithm 2264 that is used to encipher the RA, TA, TV, and N. The output of enciphering the RA, TA, TV, and N with k is the FAC 2266. When it is the correct time to transmit the wake-up frame, the AP transmits the clock resynchronization frame, including the FC, RA, TV, N, and FAC fields, as described above.

As described above, the STA 2210 associates with the AP 2202 and acquires the TK, TA, and periodic schedule. In addition, the STA initializes or resets a sequence number N during the association with the AP. The STA may then deactivate the primary radio 2212 and ultra-low power receiver 2214. After the STA receives the TK (e.g., during the association with the AP), the STA derives a lightweight key, k, from the TK at 2270. The STA uses the same derivation function to derive k as the AP uses at 2262, and thus the k derived by the STA is identical to the k derived by the AP.

The STA activates the ultra-low power receiver according to the periodic schedule. When the ultra-low power receiver is active, the STA may receive one or more frames. For each frame the STA receives, the STA determines if the RA field of the frame matches the RA of the STA and if the FC field indicates the frame is a clock resynchronization frame. If the FC field indicates the frame is a clock resynchronization frame and the RA matches, then the STA extracts a FAC, TV, and N, from the frame. The key, k, is then used by the STA as a key in a lightweight cipher algorithm 2272 that is used to encipher the RA, TA, TV, and N. The lightweight cipher algorithm 2272 is identical to the lightweight cipher algorithm 2264 used by the AP. The output of enciphering the RA, TA, TV, and N with k is the local FAC 2274. Because the key k, RA, TA, TV, N, and lightweight cipher algorithms used by the AP and STA are identical, the local FAC 2274 computed by the STA is identical to the FAC 2266 computed by the AP. If the value 2280 in the received FAC field matches the local FAC, then the STA uses the time value (TV) of the frame to resynchronize a clock of the STA. If the local FAC does not match the received FAC, then the STA determines to discard the frame as invalid.

According to aspects of the present disclosure, the FAC is dynamic because of the TV used to compute the FAC, and therefore the FAC cannot be pre-computed.

According to aspects of the present disclosure, a sequence number N may be used to protect the communications system against a replay attack. In a replay attack, a malicious device may record and replay a clock resynchronization frame in an effort to cause a STA to synchronize a clock of the STA according to an old TV from the replayed clock resynchronization frame. The sequence number N may be used by a STA to determine if the received clock resynchronization frame is valid or contains an old TV. The sequence number N can be initialized (e.g., set to 0) during each association (e.g., during each wake-up) of the STA to the AP. Each time a receiver (e.g., a STA) successfully decodes a clock resynchronization frame, the receiver may set the stored value of N based on the value of N received in the clock resynchronization frame. N may be incremented by a transmitter (e.g., an AP) each time the transmitter transmits a clock resynchronization frame. Thus, if a STA receives a clock resynchronization frame which includes a sequence number N that does not equal or exceed an expected sequence number (e.g., one more than the value of N stored by the STA), the STA can discard the clock resynchronization frame as invalid. If a STA fails to decode one or more clock resynchronization frames before successfully decoding a clock resynchronization frame, the sequence number in the successfully decoded clock resynchronization frame will exceed the expected sequence number, and the STA can determine to use the time value in the clock resynchronization frame.

The sequence number N may be used to determine a position of a clock resynchronization frame or time value in an ordered set of clock resynchronization frames or time values. Thus, while the exemplary system is described in terms of a sequence number that is incremented and becomes larger over time, the disclosure is not so limited, and other sequence numbering techniques (e.g., decrementing from a high initial value, incrementing by a value other than one) are included in the scope of the disclosure.

According to aspects of the present disclosure, an adversary has only a limited time to attempt a brute force attack on the security provided by the k/FAC security between two valid clock resynchronization frames. To be successful, an attacker would need to guess the FAC, or equivalently k, and transmit a frame using the guessed FAC during one of the time periods that the STA is scheduled to activate the ultra-low power receiver. In addition, the attacker must guess the FAC before the AP transmits a clock resynchronization frame to the STA, because the STA and AP determine a new N, and hence, a new FAC, when the STA receives a clock resynchronization frame.

As described above, replay attacks may also be prevented because the sequence number changes after each successfully decoded clock resynchronization frame. According to aspects of the present disclosure, the size of the sequence number field may be determined based on an average time between incidents of resynchronizing a clock of a receiver and the period of how often the receiver is woken up, causing the sequence number to be reset. For example, if a receiver is a woken up once per day and the clock of the receiver should be resynchronized once per minute, then the counter must support a value of at least 1,440 (i.e., the number of minutes in one day). In the example, using two bytes for the sequence number is more than sufficient.

According to aspects of the present disclosure, if the sequence number approaches within a threshold amount of the maximum value allowed in the sequence number field of a clock resynchronization (e.g., because of a long period of time between the receiver waking up), an AP may send a wake-up frame in order to generate a new TK and reset the sequence number for the affected STA.

According to certain aspects, the time value of a clock resynchronization frame may comprise the LSBs of a value of a clock associated with the AP.

Figure 23:
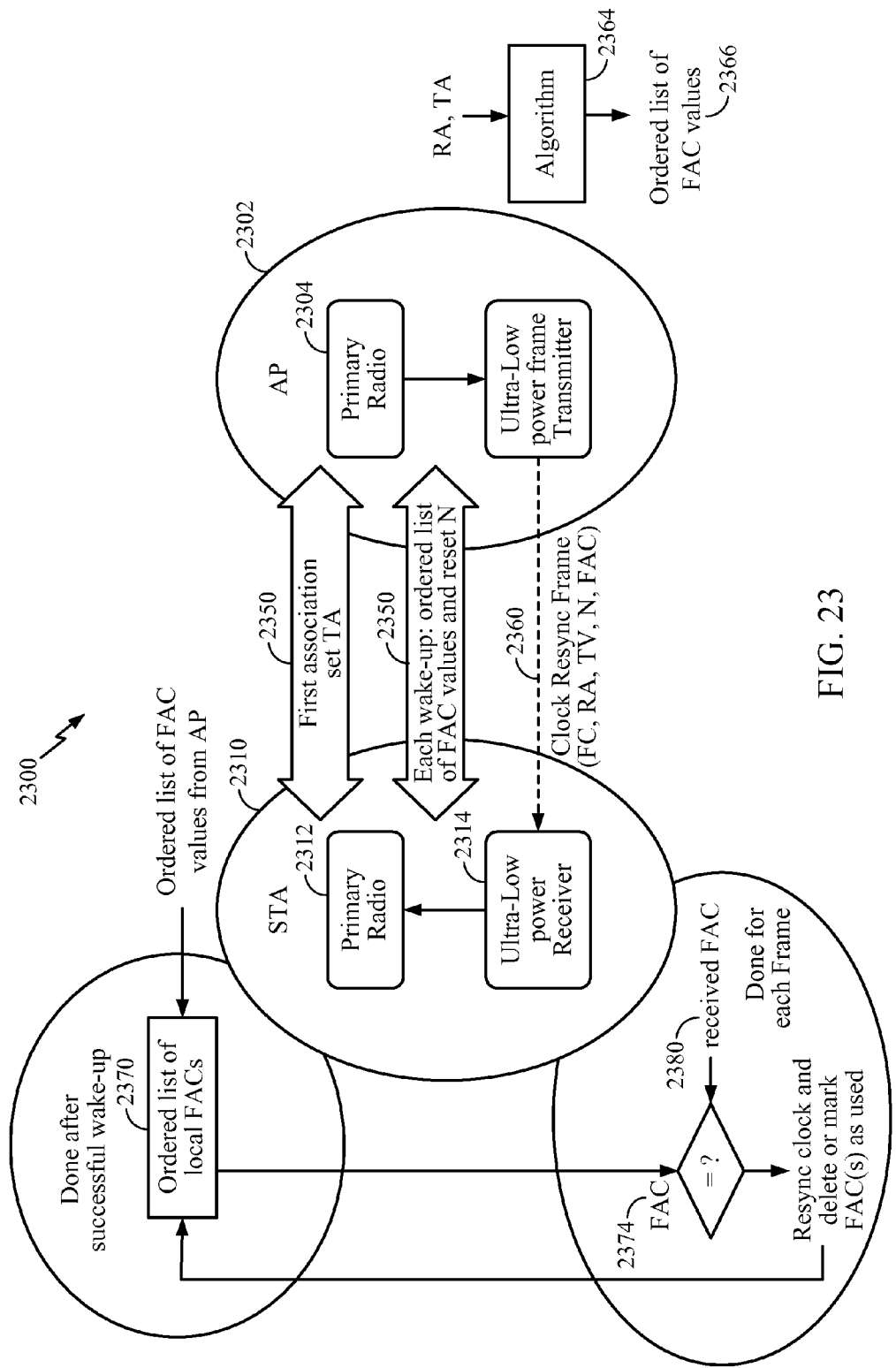
FIG. 23 illustrates an exemplary communication system in which techniques of the present disclosure may be practiced.

FIG. 23 illustrates an exemplary communication system 2300 in which techniques for using ultra-low power clock resynchronization frames including frame authentication codes (FACs) may be practiced, according to aspects of the present disclosure. In communication system 2300, an AP supplies an ordered list of values (e.g., passwords or magic numbers) to be used as FACs by a STA. The AP and STA store the ordered list of FACs for use in transmitting and receiving ultra-low power clock resynchronization frames. Otherwise, communication system 2300 is similar to communication system 2200 and the description of communication system 2300 focuses on differences from communication system 2200.

Differences in operation between communication system 2200 and communication system 2300 will now be described, with reference to FIG. 23.

The AP may determine an ordered list of values 2366 to be used as FACs using any of a number of known algorithms 2364. The values may be calculated by the AP based on the TK of the previous session (e.g., the first association with the STA), the TA of the AP, the RA of the STA, and a sequence number for each value, for example. Unlike in FIG. 22, the AP transmits the ordered list of FACs to the STA 2310 during the association at 2350. The AP also stores the ordered list of values to be used as FACs in ultra-low power clock resynchronization frames and resets (i.e., initializes) the sequence number N.

As in FIG. 22, when the AP generates a clock resynchronization frame the frame includes an FC field, an RA field, a TV field, a sequence number N field, and a FAC field. The AP determines the FAC by selecting the value in the ordered list of FAC values 2366 that corresponds to the sequence number N of the clock resynchronization frame that the AP is generating.

The STA 2310 associates with the AP 2302 at 2350 and receives the TA, periodic schedule, and ordered list of FAC values via transmissions from the AP during the association. In addition, the STA stores the received ordered list of FAC values as a stored list 2370 and resets (i.e., initializes) the stored value of sequence number N. The STA may then deactivate the primary radio 2312 and ultra-low power receiver 2314.

As in FIG. 22, if the STA receives a clock resynchronization frame for the STA, the STA extracts a sequence number N and a FAC from the frame. If the received sequence number N does not equal or exceed the stored value of N, then the STA discards the clock resynchronization frame. If the received sequence number N equals or exceeds the stored value of N, then the STA compares the FAC 2380 in the received FAC field to the local FAC 2374 from the ordered list of local FACs 2370 that corresponds to the received sequence number N. If the received FAC 2380 matches the corresponding local FAC 2374, then the STA treats the clock resynchronization frame as valid, otherwise the STA treats the clock resynchronization frame is invalid. If the clock resynchronization is valid, the STA sets the stored value of sequence number N based on the received value of sequence number N and resynchronizes a clock of the STA.

According to aspects of the present disclosure, using an ordered list of FACs 2370 corresponding to sequence numbers N may protect the communications system against a replay attack. The combination of the sequence number N and the FAC may be used by a STA to determine if the received clock resynchronization frame is valid or invalid (e.g., contains an old TV). A new ordered list of FACs 2370 may be stored by a STA during each association (e.g., during each wake-up) of the STA to the AP. Each time a receiver (e.g., a STA) synchronizes to a clock resynchronization frame, the receiver sets the stored value of sequence number N based on the value of N received in the clock resynchronization frame. A transmitter (e.g., an AP) may select a FAC from an ordered list 2366 corresponding to the sequence number N each time the transmitter transmits a clock resynchronization frame. Thus, if a STA receives a clock resynchronization frame which includes a sequence number N that does not equal or exceed an expected value, the STA can discard the clock resynchronization frame as invalid. If a STA fails to decode one or more clock resynchronization frames before successfully decoding a clock resynchronization frame, the sequence number N in the successfully decoded clock resynchronization frame will equal or exceed the expected value, and the STA can determine if the FAC in the clock resynchronization frame matches the FAC corresponding to the received sequence number to determine whether to use the time value in the clock resynchronization frame.

According to aspects of the present disclosure, an adversary has only a limited time to attempt a brute force attack on the security provided by the FAC security between two valid associations of a STA to an AP. To be successful, an attacker would need to guess a FAC corresponding to a sequence number from the ordered list of FACs, and transmit a frame using the sequence number and the guessed FAC during one of the time periods that the STA is scheduled to activate the ultra-low power receiver. In addition, the attacker must guess the FAC before the AP transmits a new ordered list of FACs during an association of the STA to the AP.

According to aspects of the present disclosure, if the sequence number N equals or exceeds a threshold number (e.g., because of a long period of time between instances of the receiver waking up), an AP may send a wake-up frame in order to generate a new ordered list of FAC values and transmit the new ordered list to the affected STA.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1600, 1700, 1800, and 2100 illustrated in FIGS. 16, 17, 18, and 21, respectively, correspond to means 1600A, 1700A, 1800A, and 2100A illustrated in FIGS. 16A, 17A, 18A, and 21A respectively.

For example, means for transmitting may comprise a transmitter (e.g., the transceiver 254) and/or an antenna(s) 252 of UE 120 or the transmitter (e.g., the transceiver 222) and/or antenna(s) 224 of the AP 110 illustrated in FIG. 2. Means for receiving may comprise a receiver (e.g., the transceiver 254) and/or an antenna(s) 252 of the UE 120 or the receiver (e.g., the transceiver 222) and/or antenna(s) 224 of the AP 110 illustrated in FIG. 2. Means for processing, means for determining, means for generating, means for computing, means for taking action, and/or means for obtaining may comprise a processing system, which may include one or more processors of the UE 120 or the AP 110 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
at least one interface configured to obtain a frame via at least one of a first radio or a second radio, wherein the frame comprises a receiver address, wherein the at least one interface obtains the frame from another apparatus via the second radio while the first radio is in a first power state, and wherein the at least one interface obtains the frame from the other apparatus according to a periodic schedule identifying when the second radio is to listen for the frame; and
a processing system configured to:
take one or more actions based on whether or not an authentication code included in the frame matches a local authentication code and whether or not the apparatus is a targeted recipient of the frame, wherein the one or more actions comprise causing the first radio to exit the first power state when the authentication code included in the frame matches the local authentication code and the receiver address indicates that the apparatus is a targeted recipient of the frame.

2. The apparatus of claim 1, wherein the processing system is configured to derive the local authentication code from a transient key (TK) determined from a prior communication with the other apparatus.

3. The apparatus of claim 1, wherein the processing system is configured to derive the local authentication code from a transmitter address of the other apparatus determined from a prior communication with the other apparatus.

4. The apparatus of claim 1, wherein:
the processing system is configured to keep the first radio in the first power state if the receiver address indicates the apparatus is not a targeted recipient of the frame.

5. The apparatus of claim 1, wherein the at least one interface is further configured to obtain the local authentication code from the other apparatus.

6. The apparatus of claim 1, wherein the one or more actions comprise setting a clock of the apparatus based on a time value in the frame.

7. The apparatus of claim 6, wherein:
the frame comprises a sequence number; and
the one or more actions comprise setting a clock of the apparatus based on a time value in the frame if the sequence number equals or exceeds a threshold value.

8. The apparatus of claim 7, wherein the processing system is configured to compare the sequence number to the threshold value and if the sequence number equals or exceeds the threshold value, subsequently reset the sequence number.

9. The apparatus of claim 7, wherein the processing system is configured to reset the sequence number, if the one or more actions cause the first radio to exit the first power state.

10. An apparatus for wireless communications, comprising:
 a processing system configured to:
  determine, based on capabilities information of another apparatus obtained via a communication with the other apparatus, whether the other apparatus is capable of receiving a frame, via a second radio, while a first radio is in a first power state; and
  based on the determination, generate a frame comprising an authentication code to be used for authenticating the frame, wherein the frame is generated based on a receiver address of the other apparatus; and
 at least one interface configured to output the frame for transmission to the other apparatus, wherein the frame is output for transmission according to a periodic schedule established for the second radio at the other apparatus to listen for the frame.

11. The apparatus of claim 10, wherein the processing system is configured to derive the authentication code from a transient key (TK) determined from a prior communication with the other apparatus.

12. The apparatus of claim 10, wherein the processing system is configured to derive the authentication code from a transmitter address of the apparatus.

13. The apparatus of claim 10, wherein the processing system is further configured to communicate with the other apparatus via the first radio after transmission of the frame to the other apparatus.

14. The apparatus of claim 10, wherein the processing system is further configured to generate another frame comprising the authentication code and the at least one interface is further configured to output the other frame for transmission to the other apparatus via the first radio.

15. The apparatus of claim 10, wherein the frame comprises a time value of the apparatus.

16. The apparatus of claim 15, wherein:
 the frame comprises a sequence number, wherein the sequence number indicates a position of the time value in a set of time values; and
 the processing system is further configured to generate the sequence number based on a communication with the other apparatus.

17. A user terminal, comprising:
 at least one antenna;
 at least one interface configured to obtain a frame via at least one of a first radio or a second radio using the at least one antenna, wherein the frame comprises a receiver address, wherein the at least one interface obtains the frame from another apparatus via the second radio while the first radio is in a first power state, and wherein the at least one interface obtains the frame from the other apparatus according to a periodic schedule identifying when the second radio is to listen for the frame; and
 a processing system configured to:
  take one or more actions based on whether or not an authentication code included in the frame matches a local authentication code and whether or not the apparatus is a targeted recipient of the frame, wherein the one or more actions comprise causing the first radio to exit the first power state when the authentication code included in the frame matches the local authentication code and the receiver address indicates that the apparatus is a targeted recipient of the frame.

18. The apparatus of claim 10, further comprising:
 at least one antenna coupled to the at least one interface, wherein the frame is transmitted via the at least one antenna, and wherein the apparatus is configured as an access point.

* * * * *